US012694604B2

(12) United States Patent
Salmi et al.

(10) Patent No.: US 12,694,604 B2
(45) Date of Patent: Jul. 28, 2026

(54) LEARNED IMAGE TRANSFORMATION METHODS AND SYSTEMS IN GRAPHICS RENDERING

(71) Applicant: Imagination Technologies Limited, Kings Langley (GB)

(72) Inventors: Arturo Tommaso Salmi, Hertfordshire (GB); Szabolcs Cséfalvay, Hertfordshire (GB); James Imber, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 143 days.

(21) Appl. No.: 18/631,382

(22) Filed: Apr. 10, 2024

(65) Prior Publication Data

US 2024/0378791 A1     Nov. 14, 2024

(30) Foreign Application Priority Data

Apr. 12, 2023    (GB) ...................................... 2305381
Apr. 12, 2023    (GB) ...................................... 2305382

(51) Int. Cl.
*G06T 15/00*        (2011.01)
*G06T 3/40*         (2006.01)
(Continued)

(52) U.S. Cl.
CPC .............. *G06T 15/005* (2013.01); *G06T 3/40* (2013.01); *G06T 5/50* (2013.01); *G06T 5/60* (2024.01);
(Continued)

(58) Field of Classification Search
None
See application file for complete search history.

(56) References Cited

U.S. PATENT DOCUMENTS 12,299,896 B1 *   5/2025   Feng ...................... G06T 11/00
12,333,427 B2 *   6/2025   Smith .................... G06N 3/047
(Continued)

FOREIGN PATENT DOCUMENTS

CN        109410310 A      3/2019

OTHER PUBLICATIONS

Bi et al; "Deep CG2Real: Synthetic-to-Real Translation via Image Disentanglement"; 2019 IEEE/CVF International Conference on Computer Vision (ICCV); Oct. 27, 2019; pp. 2730-2739.
(Continued)

*Primary Examiner* — Martin Mushambo
(74) *Attorney, Agent, or Firm* — Potomac Law Group, PLLC; Vincent M DeLuca

(57)            ABSTRACT

Transforming rendered frames in a graphics processing system to obtain enhanced frames with desired characteristics of a set of target images includes selecting a plurality of shaders, each defined by a parametrized mathematical function arranged to replicate a particular visual characteristic. For each shader, parameters of the parametrized mathematical function have been derived in dependence on a set of target images so that the shader is arranged to impose its respective particular visual characteristic in dependence on an extent to which the particular visual characteristic is exhibited in the target images. The plurality of shaders are combined to form a pipeline, obtaining one or more rendered frames, applying the pipeline to at least a portion of the one or more rendered frames to obtain enhanced frames, and outputting for display the enhanced frames, wherein the enhanced frames exhibit visual characteristics of the target images.

20 Claims, 12 Drawing Sheets

(51) Int. Cl.

| | |
|---|---|
| *G06T 5/50* | (2006.01) |
| *G06T 5/60* | (2024.01) |
| *G06T 5/70* | (2024.01) |
| *G06T 15/50* | (2011.01) |

(52) U.S. Cl.
CPC ............... *G06T 5/70* (2024.01); *G06T 15/50* (2013.01); *G06T 2207/20021* (2013.01); *G06T 2207/20084* (2013.01); *G06T 2207/20204* (2013.01); *G06T 2207/20212* (2013.01)

(56) References Cited

U.S. PATENT DOCUMENTS

| | | | |
|---|---|---|---|
| 2013/0207978 A1* | 8/2013 | Keller .................... | G06T 15/50 |
| | | | 345/426 |
| 2014/0079314 A1* | 3/2014 | Yakubovich ....... | G06V 10/7625 |
| | | | 382/155 |
| 2014/0160143 A1 | 6/2014 | Ballestad et al. | |
| 2019/0042923 A1* | 2/2019 | Janedula ................ | G06F 17/16 |
| 2020/0027202 A1* | 1/2020 | Oh ............................ | G06T 5/20 |
| 2020/0051309 A1* | 2/2020 | Labbe ....................... | G06T 1/60 |
| 2020/0145644 A1* | 5/2020 | Cordes .................... | G06T 15/50 |
| 2020/0167161 A1 | 5/2020 | Planche et al. | |
| 2020/0193674 A1* | 6/2020 | Pharr ...................... | G06T 15/08 |
| 2020/0273231 A1 | 8/2020 | Schied et al. | |
| 2021/0201526 A1* | 7/2021 | Moloney ................ | G06N 3/084 |
| 2022/0122222 A1* | 4/2022 | Smith ................... | G06F 18/214 |
| 2022/0130013 A1* | 4/2022 | Pottorff ................. | G06T 3/4053 |
| 2022/0148256 A1* | 5/2022 | Liu ........................... | G06T 5/70 |
| 2022/0321830 A1* | 10/2022 | Niklaus .................... | G06N 3/09 |
| 2023/0070778 A1* | 3/2023 | Jhang ....................... | G06T 5/20 |
| 2023/0215139 A1* | 7/2023 | Sikka ................... | G06V 10/751 |
| | | | 382/155 |
| 2024/0242394 A1* | 7/2024 | Mangla ............... | G06V 10/764 |

OTHER PUBLICATIONS

Carlson et al; "Sensor Transfer: Learning Optimal Sensor Effect Image Augmentation for Sim-to-Real Domain Adaptation"; Sep. 17, 2018; arXiv:1809.06256v1 [cs.CV]; 8 pages.

Hughes et al; "Bloom and Lens Flare"; In: "Computer Graphics: Principals and Practice"; Jul. 30, 2013; p. 369.

Jiang et al; "EnlightenGAN: Deep Light Enhancement Without Paired Supervision"; IEEE Transactions on Image Processing; vol. 30; Jan. 22, 2021; pp. 2340-2349.

Mandl et al; " Neural Cameras: Learning Camera Characteristics for Coherent Mixed Reality Rendering"; 2021 IEEE International Symposium on Mixed and Augmented Reality (ISMAR); Oct. 4, 2021; pp. 508-516.

Tewari et al; "State of the Art on Neural Rendering"; Retrieved from the Internet: URL:https://arxiv.org/pdf/2004.03805.pdf; vol. 39; No. 2; Apr. 8, 2020; pp. 1-27.

\* cited by examiner

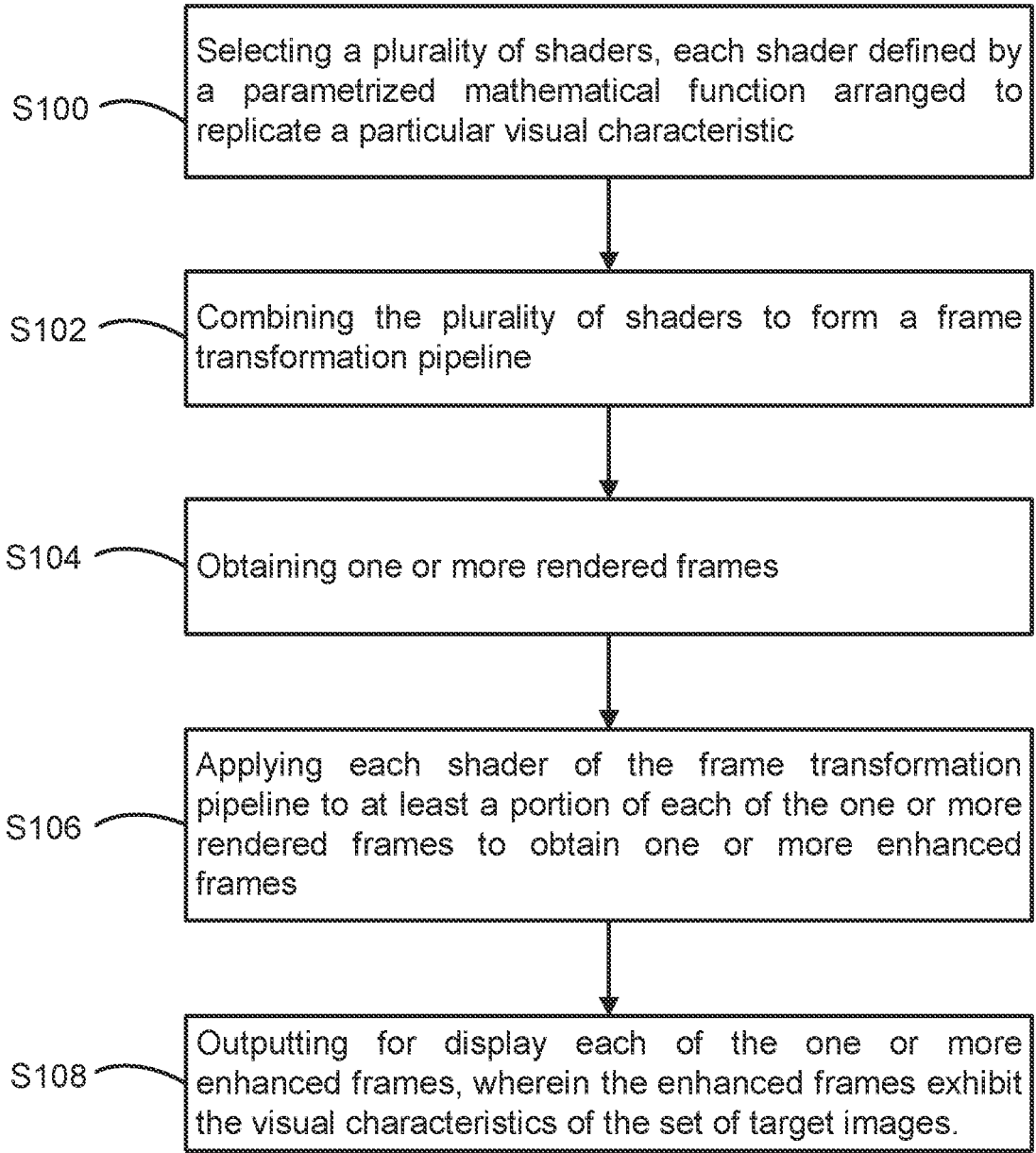

S100 — Selecting a plurality of shaders, each shader defined by a parametrized mathematical function arranged to replicate a particular visual characteristic S102 — Combining the plurality of shaders to form a frame transformation pipeline S104 — Obtaining one or more rendered frames S106 — Applying each shader of the frame transformation pipeline to at least a portion of each of the one or more rendered frames to obtain one or more enhanced frames S108 — Outputting for display each of the one or more enhanced frames, wherein the enhanced frames exhibit the visual characteristics of the set of target images.

FIGURE 8

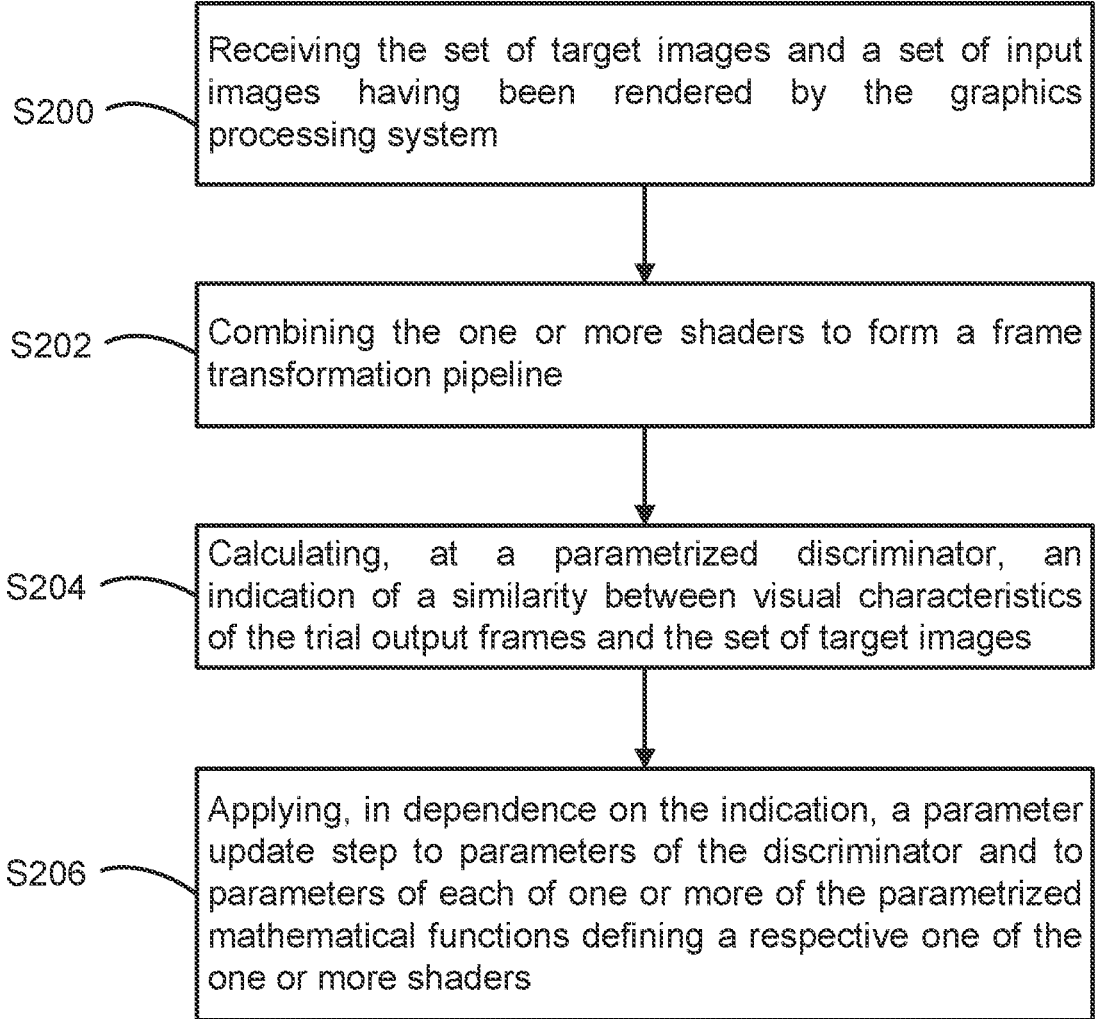

S200 — Receiving the set of target images and a set of input images having been rendered by the graphics processing system S202 — Combining the one or more shaders to form a frame transformation pipeline S204 — Calculating, at a parametrized discriminator, an indication of a similarity between visual characteristics of the trial output frames and the set of target images S206 — Applying, in dependence on the indication, a parameter update step to parameters of the discriminator and to parameters of each of one or more of the parametrized mathematical functions defining a respective one of the one or more shaders

FIGURE 9

LEARNED IMAGE TRANSFORMATION METHODS AND SYSTEMS IN GRAPHICS RENDERING

CROSS-REFERENCE TO RELATED APPLICATIONS AND CLAIM OF PRIORITY

This application claims foreign priority under 35 USC 119 from United Kingdom patent application Nos. GB2305382.0 and GB2305381.2 both filed on 12 Apr. 2023, the contents of which are incorporated by reference herein in their entirety.

TECHNICAL FIELD

The present disclosure relates to techniques for using learned shaders capable of replicating image characteristics, in particular for applying post-processing in graphics rendering systems.

BACKGROUND

In computer graphics, a shader is used during the rendering of a scene to calculate and apply a desired trait, or a part thereof, to the rendered frames. Shaders comprise a mathematical function or algorithm that is applied to a set of pixels or vertices of the rendered frame. Some shaders are applied after the geometry of the scene has been rendered (e.g., by rasterisation), i.e., as a post-process. Shaders apply traits such as a certain type of lighting, hue, saturation, texture and the like. Shader algorithms may also be designed to alter the position of pixels/vertices to produce a final rendered image. In principle, a shader can be implemented to apply any visual characteristic or effect to a rendered image, and multiple shaders may be used in combination to achieve a particular effect. As described herein, some shaders are used for vertex and fragment shading, and other shaders may implement a post-processing method. The term 'post-processing' is used herein to refer to applying some processing to pixel values of an existing image, e.g., an image which has been rendered by a GPU. In these cases, the pixel values of the existing image may be read back into the GPU (e.g. as the texels of a texture) before being processed and applied to yield the fragments (pixels) of a new, post-processed, image. Simple post-processing shaders, e.g., that apply a certain hue to an image, can be manually coded and are thus algorithmically straightforward to implement and computationally cheap to apply during rendering.

More generally, image transformation algorithms (i.e., that perform some form of image-to-image translation or filtering effect) have been implemented using machine learning methods, e.g., neural networks. For example, image transformation algorithms can be implemented to match a desired image characteristic or design style, without manual design or adjustment (e.g. choice of suitable parameters). In this way, a neural network can be trained to map a set of input (e.g. rendered) images to a set of target (e.g. photographic/photorealistic) images, to learn one or more arbitrary characteristics. Such image transformation algorithms operate globally, i.e., such that they learn all characteristics of a target.

One way to train image-transformation neural networks is to use an adversarial network, which uses a zero-sum game to train a generator network using a discriminator network. The discriminator is trained simultaneously with the generator to classify transformed images as 'fake' (i.e., having been generated by the generator) or 'real' (belonging to the set of the target images). These adversarial networks are called Generative Adversarial Networks (GANs). Both networks of the GAN, i.e., the generator and discriminator, contain learnable parameters. The goal of the generator is to produce an output that replicates characteristics of the target such that it can deceive the discriminator, and the goal of the discriminator is to distinguish between the output of the generator and the 'true' target data. In other words, the generator has the objective of being trained to fool the discriminator, and the discriminator has the objective of learning to distinguish the generator output from the target data. GANs are known to be usable for both paired and unpaired data.

At deployment, the generator from the GAN can therefore be used without the discriminator to transform an arbitrary input image to obtain characteristics of a target dataset. Large neural networks (NNs) produced in this way can produce accurate results almost indistinguishable from a target image set. The term 'large neural network' (or elsewhere referred to as a 'fully parameterised neural network') is intended to refer to a neural network with a large number of layers and parameters (e.g., around 1-10 million parameters or more). For example, fully parametrised NNs trained using a GAN can be effective in producing photorealistic images using computer-generated images as input. However, large NNs are very computationally expensive to use even when optimised (e.g., when approximated using a sparser set of parameters, or using lower bit depths to represent parameters). This is due to the sheer number of parameters: e.g., on the order of 10 million or more. Additionally, because neural networks are trained to simulate arbitrary characteristics (e.g., nebulous traits such as artistic style), the huge number of parameters required mean that such neural networks are undifferentiated 'black boxes' that learn features indiscriminately. In other words, large NNs learn all characteristics from all pixel information available, without discretion, given the unsupervised nature of a GAN. In other words, once trained, a large NN has a fixed functionally that has necessarily learned all characteristics from a set of target images (i.e., even characteristics that are undesirable). Moreover, once trained, NNs cannot be easily modified because the functionality of the parameters cannot be disentangled, are not semantically meaningful, and moreover are only interpretable within the holistic context of the containing network. In other words, it is not possible to refine or train a specific function without influencing the other functionalities within a large, trained, NN. Such NNs may also be referred to a 'undifferentiated' neural networks. This carries the disadvantage that non-desired characteristics cannot easily be removed, and additional, desirable, characteristics cannot be added to the large, undifferentiated, NN. To do so would require retraining of the entire NN, which is also very time consuming. Furthermore, large NNs are generally only useful for image-to-image transformation for a small number of images, given their computational expense. Finally, networks with millions of parameters are unfeasible for deployment for real-time processing, particularly in resource-constrained settings such as mobile and automotive rendering applications, due to memory, power, bandwidth, area, and latency considerations. Thus, such NNs are not currently applicable for use as shaders in graphics processing, which renders them far too costly for a live or 'online' (e.g., in real-time) implementation.

It would therefore be advantageous to develop an image transformation method capable of learning to replicate salient characteristics of a set of target images, and in a more efficient manner which is more amenable to modification so that it can be used during live (e.g., real-time) graphics rendering.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure pertains to learned image transformation methods and systems in graphics rendering. There is provided a method of transforming rendered frames in a graphics processing system to obtain enhanced frames with desired characteristics of a set of target images. The method comprises selecting a plurality of shaders, each defined by a parametrized mathematical function arranged to replicate a particular visual characteristic. For each shader: parameters of the parametrized mathematical function have been derived in dependence on a set of target images so that the shader is arranged to impose, when applied to a frame, its respective particular visual characteristic in dependence on an extent to which the particular visual characteristic is exhibited in the target images. The method further comprises combining the plurality of shaders to form a pipeline, obtaining one or more rendered frames, applying the pipeline to at least a portion of the one or more rendered frames to obtain enhanced frames, and outputting for display the enhanced frames, wherein the enhanced frames exhibit visual characteristics of the target images.

There is provided a method of transforming rendered frames in a graphics processing system to obtain enhanced frames comprising one or more desired characteristics exhibited in a set of target images, the method comprising:

selecting a plurality of shaders, each shader defined by a parametrized mathematical function arranged to replicate a particular visual characteristic, wherein, for each shader of the plurality of shaders: parameters of the parametrized mathematical function have been derived in dependence on a set of target images in order that the shader is arranged to impose, when applied to a frame, its respective particular visual characteristic in dependence on an extent to which the particular visual characteristic is exhibited in the set of target images;

combining the plurality of shaders to form a frame transformation pipeline;

obtaining one or more rendered frames;

applying each shader of the frame transformation pipeline to at least a portion of each of the one or more rendered frames to obtain one or more enhanced frames; and outputting for display each of the one or more enhanced frames, wherein the enhanced frames exhibit the visual characteristics of the set of target images. The rendered frames may be obtained from the graphics processing system or a remote graphics processing system. Alternatively, the rendered frames may be obtained from storage, having been produced by any suitable rendering engine.

The parameters of the parametrized mathematical function may have been derived using a neural network based on an adversarial objective function. The neural network may be a generative adversarial network, GAN, comprising an image frame generator configured to produce candidate frames, and a discriminator configured to calculate a probability that the candidate frames produced by the image frame generator belong in the set of target images.

The image frame generator may comprise one or more precursor shaders, and the GAN may be configured to derive parameters for the one or more precursor shaders, in dependence on the set of target images, wherein the derived parameters represent parameters defining one or more parametrized mathematical functions that define a respective one or more shaders that form the frame transformation pipeline. The image frame generator may be configured to produce the candidate frames based on input frames rendered by the graphics processing system.

Each parametrized mathematical function may represent an image-capture characteristic, and the particular visual characteristic each shader is arranged to replicate may be a physical phenomenon associated with an image-capture process. For example, the physical phenomenon associated with the image-capture process may be an attribute of a camera lens and/or a camera sensor. The set of target images may comprise photographs captured by an image capture device. The image capture device may be a digital camera, and may be a film camera.

Each of the plurality of shaders may be substantially mathematically orthogonal, such that each respective particular visual characteristic imposed by each shader in the one or more enhanced frames is substantially not affected by an imposed particular visual characteristic of any other shader of the plurality of shaders.

The frame transformation pipeline may comprise at least one neural network configured to further enhance frames based on a desired visual characteristic.

The frame transformation pipeline may also comprise a parameter-adapting neural network, the method further comprising, prior to applying the shaders of the frame transformation pipeline to at least a portion of each of the one or more rendered frames: modifying, by the parameter-adapting neural network, one or more parameters of the one or more shaders in dependence on the one or more rendered frames. For example, the parameter-adapting neural network can be trained to adapt/modify at least some parameters of one or more shaders based on the local content of the rendered frames image, in real time. This would advantageously allow for the functionality of the shaders to be dependent on the rendered images to be enhanced, and moreover dependent on local context of the rendered images.

The step of applying each shader may comprise applying each shader in an order corresponding to an order in which the physical phenomena associated with an image-capture process would occur.

The step of combining the plurality of shaders to form a frame transformation pipeline may comprise coalescing one or more of the shaders of the plurality shaders into a combined shader unit that is arranged to replicate each respective particular visual characteristic of the one or more coalesced shaders.

One of the plurality of shaders may be a lens blur shader configured to replicate lens blur. The parametrized mathematical function may comprise at least one kernel comprising an array of values, wherein applying the lens blur shader comprises convolving the at least one kernel over at least a portion of an array of values representing pixels of the one or more rendered frames.

One of the plurality of shaders may be a colour mapping shader configured to replicate colour mapping and/or distortion of the set of target images, wherein applying the colour mapping may comprise applying a linear transformation and an offset to an array of values representing pixels of the one or more rendered frames.

One of the plurality of shaders may be a bloom shader configured to replicate the effect of light bleeding due to oversaturation in an image-capture system. Applying the bloom shader to an input frame of the one or more rendered frames may comprise: downsampling the input frame to obtain a plurality of sub-frames each having a lower image resolution than a resolution of the input frame; and, for each sub-frame: extracting a luma channel; isolating portions of the extracted luma channel above a brightness threshold; applying a blurring function to the isolated portions to obtain a bloomed sub-frame. The method may further comprise: rescaling and combining each of the obtained bloomed sub-frame to obtain a bloom mask having the resolution of the input frame; and combining the bloom mask with the input frame.

One of the plurality of shaders may be a sensor noise shader configured to replicate noise of a digital camera sensor or grain of a film camera, wherein applying the sensor noise shader may comprise applying randomly distributed perturbations to values representing pixels of the one or more rendered frames.

Each shader of the plurality of shaders may be a post-processing shader. The parametrized mathematical function defining each shader may operates on pixel values of the portions of each of the one or more rendered frames during the step of applying each shader of the frame transformation pipeline.

The applying each shader of the frame transformation pipeline to the at least a portion of each of the one or more rendered frames may comprise, for each portion to which the frame transformation pipeline is applied: applying all shaders that form the frame transformation pipeline to a plurality of contiguous regions of the portion, wherein all shaders are applied to each region in turn, to obtain a plurality of enhanced sub-frames; and combining the enhanced sub-frames to obtain an enhanced frame of the one or more enhanced frames. Such a method of shader application may be termed a 'depth first' application, and confers the advantage of improving bandwidth and improving efficiency. For example, it can be advantageous to combine all shaders into a single compute kernel, and thus apply the single compute kernel (comprising the functionality of all shaders) to the one or more rendered frame region-by-region. This has particular advantages to parallel implementation, e.g., in a GPU, where the same function can be applied to multiple pixels or regions of pixels concurrently.

There is also provided a frame transformation pipeline module configured to transform rendered frames in a graphics processing system to obtain enhanced frames comprising one or more desired characteristics exhibited in a set of target images, the frame transformation pipeline comprising logic configured to:

select a plurality of shaders, each shader defined by a parametrized mathematical function arranged to replicate a particular visual characteristic, wherein, for each shader of the plurality of shaders: parameters of the parametrized mathematical function have been derived in dependence on a set of target images in order that the shader is arranged to impose, when applied to a frame, its respective particular visual characteristic in dependence on an extent to which the particular visual characteristic is exhibited in the set of target images;

combine the plurality of shaders to form a frame transformation pipeline;

obtain one or more rendered frames;

apply each shader of the frame transformation pipeline to at least a portion of each of the one or more rendered frames to obtain one or more enhanced frames; and output for display each of the one or more enhanced frames, wherein the enhanced frames exhibit the visual characteristics of the set of target images.

There may also be provided a frame transformation pipeline module configured to transform rendered frames in a graphics processing system to obtain enhanced frames comprising one or more desired characteristics exhibited in a set of target images, the frame transformation pipeline comprising logic configured to:

select a plurality of shaders, each shader defined by a parametrized mathematical function arranged to replicate a particular visual characteristic, wherein each shader is configured, by the parameters of the parameterized mathematical function, to impose, when applied to a frame, its respective particular visual characteristic in dependence on an extent to which the particular visual characteristic is exhibited in the set of target images;

combine the plurality of shaders to form a frame transformation pipeline;

obtain one or more rendered frames;

apply each shader of the frame transformation pipeline to at least a portion of each of the one or more rendered frames to obtain one or more enhanced frames; and output for display each of the one or more enhanced frames, wherein the enhanced frames exhibit the visual characteristics of the set of target images.

There is also provided a graphics processing system configured to perform any of the method described herein. The graphics processing system may be embodied in hardware on an integrated circuit.

There is also provided an integrated circuit manufacturing system configured to manufacture any of the graphics processing systems as described herein.

There is also provided an integrated circuit definition dataset that, when processed in an integrated circuit manufacturing system, configures the integrated circuit manufacturing system to manufacture a frame transformation pipeline module as described herein.

There is also provided a computer readable code configured to cause any of the methods described herein to be performed when the code is run.

There is also provided a training method for training a frame transformation pipeline, the frame transformation pipeline being part of a processing system and configured to transform rendered frames to produce enhanced frames comprising one or more desired characteristics exhibited in a set of target images, wherein the frame transformation pipeline comprises one or more shaders, and wherein each shader is defined by a parametrized mathematical function selected to be capable of replicating a particular visual characteristic, the training method comprising:

receiving one or more input images having been rendered by the graphics processing system, and receiving the set of target images;

applying each shader of the frame transformation pipeline to at least a portion of at least some of the one or more input images to obtain one or more candidate output frames;

calculating, at a parametrized discriminator, an indication of a similarity between visual characteristics of the candidate output frames and the set of target images;

in dependence on the indication, applying a parameter update step to parameters of the discriminator and to parameters of each of one or more of the parametrized mathematical functions defining a respective one of the one or more shaders, wherein the parameter update step is configured to derive parameters of each of said one or more of the parametrized mathematical functions in order that the respective one of the shaders is arranged to impose, when applied to a frame, its respective particular visual characteristic in dependence on an extent to which the particular visual characteristic is exhibited in the set of target images.

There may also be provided a training method as disclosed herein for training a frame transformation pipeline, the frame transformation pipeline being part of a graphics processing system and configured to transform rendered frames to produce enhanced frames comprising one or more desired characteristics exhibited in a set of target images, wherein the frame transformation pipeline comprises a plurality shaders, and wherein each of the plurality of shaders is defined by a parametrized mathematical function selected to be capable of replicating a particular visual characteristic.

There is also provided a training apparatus module for training a frame transformation pipeline, the frame transformation pipeline being part of a graphics processing system and configured to transform rendered frames to produce enhanced frames comprising one or more desired characteristics exhibited in a set of target images, wherein the frame transformation pipeline comprises one or more shaders, and wherein each shader is defined by a parametrized mathematical function selected to be capable of replicating a particular visual characteristic, the training apparatus comprising one or more processors configured to:

receive the set of target images and a set of input images having been rendered by the graphics processing system;

apply each shader of the frame transformation pipeline to at least a portion of at least some of the set of input images to obtain one or more candidate output frames;

calculate, using the parametrized discriminator, an indication of a similarity between visual characteristics of the candidate output frames and the set of target images;

in dependence on the indication, apply a parameter update step to parameters of the discriminator and to parameters of each of one or more of the parametrized mathematical functions defining a respective one of the one or more shaders, wherein the parameter update step is configured to derive parameters of each of said one or more of the parametrized mathematical functions in order that the respective one of the shaders is arranged to impose, when applied to a frame, its respective particular visual characteristic in dependence on an extent to which the particular visual characteristic is exhibited in the set of target images.

There may also be provided a training apparatus module for training a frame transformation pipeline, the frame transformation pipeline being part of a graphics processing system and configured to transform rendered frames to produce enhanced frames comprising one or more desired characteristics exhibited in a set of target images, wherein the frame transformation pipeline comprises a plurality of shaders, and wherein each shader is defined by a parametrized mathematical function selected to be capable of replicating a particular visual characteristic.

The graphics processing system or frame transformation pipeline may be embodied in hardware on an integrated circuit. There may be provided a method of manufacturing, at an integrated circuit manufacturing system, a graphics processing system or frame transformation pipeline. There may be provided an integrated circuit definition dataset that, when processed in an integrated circuit manufacturing system, configures the system to manufacture a graphics processing system or frame transformation pipeline. There may be provided a non-transitory computer readable storage medium having stored thereon a computer readable description of a graphics processing system or frame transformation pipeline that, when processed in an integrated circuit manufacturing system, causes the integrated circuit manufacturing system to manufacture an integrated circuit embodying a graphics processing system or frame transformation pipeline.

There may be provided an integrated circuit manufacturing system comprising: a non-transitory computer readable storage medium having stored thereon a computer readable description of the graphics processing system or frame transformation pipeline; a layout processing system configured to process the computer readable description so as to generate a circuit layout description of an integrated circuit embodying the graphics processing system or frame transformation pipeline; and an integrated circuit generation system configured to manufacture the graphics processing system or frame transformation pipeline according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 8 is a flowchart illustrating a method of transforming rendered frames in a graphics processing system according to embodiments of the present disclosure;

FIG. 9 is a flowchart illustrating a training method for training a frame transformation pipeline according to embodiments of the present disclosure;

Figure 1:
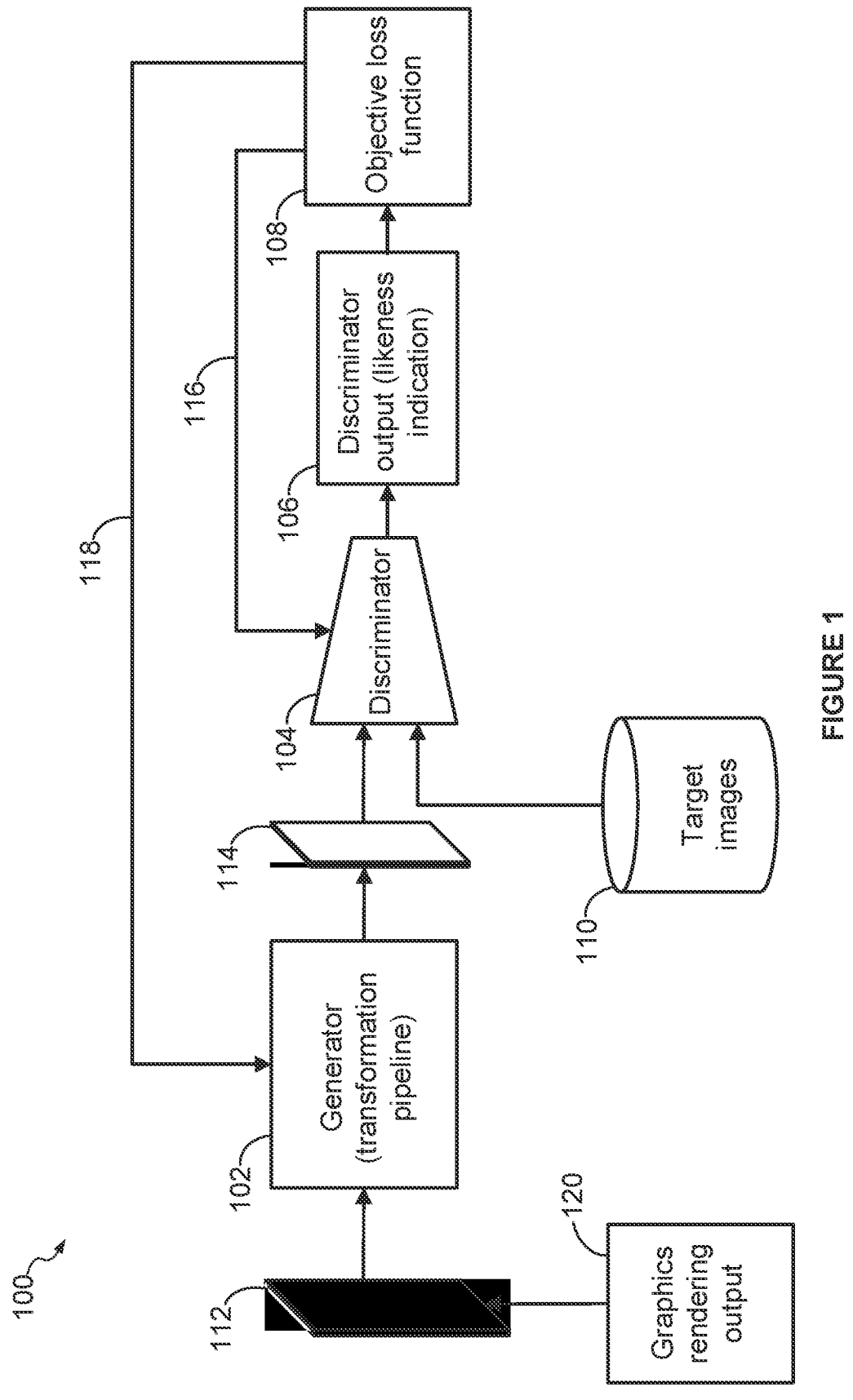
FIG. 1 shows the structure of a generative adversarial network used to train a frame transformation pipeline according to embodiments of the present disclosure.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

In contrast to using undifferentiated neural networks (NNs), which may contain on the order of 10 million parameters, the inventors have established that high-quality image-to-image transformation, for example for realism enhancement of rendered images, can be implemented using substantially fewer parameters by using a small number of shaders designed according to an understanding of the form that the mapping should take. The parametrised shaders are each defined by a function or algorithm designed to replicate a specific visual characteristic (e.g., hue, lens blur, sensor noise, lighting bloom, and the like), and are, generally, single-function shaders, at least during training. As described below in more detail, once trained, any combination of shaders may be coalesced into a single shader unit for deployment, or demerged into separate shaders and/or compute kernels, due to implementation and performance considerations. In the present disclosure, the term 'single-function shader' refers to a shader configured to impose one particular visual characteristic. Single-function shaders may still comprise a plurality of functional sub-units, multiple sub-routines and transformation steps in order to impart their particular visual characteristic.

The use of a pipeline of shaders (particularly single-function shaders) is in contrast to large NNs that are arranged to learn all possible features of a target dataset without discrimination. A small number of shaders, each one having a specific functionality that has been deliberately chosen/designed/constrained to replicate a visual characteristic, may be trained using an adversarial training framework. The trained shaders may then be combined to form an image/frame transformation pipeline. A frame transformation pipeline built in this way may have relatively few parameters, e.g., on the order of a few dozen to a few hundred. Consequently, transformation pipelines formed of single-function shaders are computationally highly efficient, and can readily be implemented in a 'live' graphics processing system (e.g., on the same GPU used for rendering frames) to impose, on every rendered frame, a desired visual characteristic, even on resource-limited hardware such as embedded GPUs. This advantage in speed is due to the small number of parameters. Furthermore, the training and/or re-training of a transformation pipeline formed of single-function shaders is fast compared to a large NN, meaning that the pipeline (or select modules therefrom) may be quickly retrained based on a new set of target images.

A further advantage of building a shader pipeline in this way is the modularity and semantic interpretability of parameters conferred by virtue of each shader having a predefined task/function. For example, a frame transformation pipeline may be obtained or modified on-the-fly using a different combination (or even permutation) of learned shaders. Different shaders in the pipeline may even be trained on different target image sets to combine desired aspects of multiple datasets. The term 'modularity', when used to describe a frame transformation pipeline, means the ability to perform any of: adding a new shader module, removing a shader module, or exchanging one shader for another without substantial (or any) retraining of any other shaders within the pipeline. Modularity of this type does not exist in fully trained, undifferentiated, neural networks. In a conventional neural network, the number or ordering of the layers (or, generally, the 'hyperparameters' used to define the structure of the network) cannot be modified in isolation once the network has been trained. Rather, the functioning of each layer in a network is necessarily dependent on all other layers, therefore the output of the network cannot be straightforwardly tuned by modifying the structure of the network (without substantial or complete re-retaining). Further in this respect, shaders according to embodiments of the present disclosure can be trained simultaneously, sequentially, or a combination thereof, and in any desired grouping of shaders (e.g., the training of one shader may be paused while other shaders are trained).

Another advantage is that shaders are separably tuneable/ trainable, because the individual shaders each impose a specific visual characteristic (i.e., are single-function). The term 'separable' refers to the property of being able to train, retrain, or modify the parameters of individual shaders in isolation from other shaders, without substantial (or any) retraining required of the other shaders in the pipeline. This is in contrast to a large neural network, which acts as a black box, meaning that the effect(s) of one group of parameters cannot be disentangled from the effect of any other group of parameters, even an orthogonal group of parameters. The visual characteristics imposed by a neural network are thus not separable, i.e., individual visual aspects imposed by a neural network cannot be modified or tuned in isolation. In the present disclosure, however, shaders may be tuned, updated or retrained on an individual basis to improve the output of the pipeline, without the need to retrain other shaders.

The separability and modularity of shaders is improved by selecting shaders that are substantially orthogonal. The meaning of orthogonal in this context means that the visual characteristics imposed by a particular shader are substantially independent of the visual characteristics imposed by other shaders, i.e., orthogonal shaders do not infringe or alter the visual effects imposed by one another. For example, the colour hue imposed by a colour mapping shader should not impact or alter the level of bloom imposed by a bloom shader, and vice versa.

The following disclosure also provides examples of how to train frame transformation pipelines. In one set of examples, shaders are described that are configured to represent an image-capture characteristic, i.e., such that the visual characteristic imposed by each shader represents a physical phenomenon associated with an image-capture process; in other words, photorealistic characteristics. However, the frame transformation pipeline and associated training methods disclosed herein are suitable for imposing any arbitrary visual characteristic that is exhibited and may be extracted from target images. This is provided that, in general, the target image dataset provides a good quality representation of the desired characteristics. In principle, there is no limit on the number of images in the target dataset that may be used to train the frame transformation pipeline. The transformation pipeline and its respective shaders disclosed herein are thus not restricted only to replicating and/or imposing photorealistic characteristics onto rendered frames. Dependent on the type of shader selected, other visual characteristics may be replicated and/or imposed on rendered images/frames, e.g., an artistic style particular to an artist (e.g., Vincent van Gogh, Georges Seurat etc.), or a rendering style of a particular cartoon or video game.

The following examples describe solutions for providing a frame transformation pipeline comprising a plurality of trained shaders, that are modular and separable, and which may be used in a live graphics rendering system, e.g., implemented by, or as part of, a GPU. One preferred use of the learned shaders is thus as part of an online graphics rendering method, where the frame transformation pipeline is imposed on frames of a rendered scene as a post-process (i.e., the final stage before the scene/frame is displayed). The shaders themselves are therefore designed to be efficient enough to be used for live rendering (e.g., for a framerate of 30 Hz, 60 Hz, or higher), though, advantageously, the training of the shaders may be done offline and so need not be accelerated.

FIG. 1 shows an example structure of a generative adversarial network (GAN) 100 that may be used to train a frame transformation pipeline. The GAN comprises a generator 102, arranged to transform an input image or image frame 112 to produce a candidate output frame 114. It will be understood that the generator 102 comprises one or more shaders to be trained (i.e., the generator may represent an untrained frame transformation pipeline). The input image 112 may itself be generated by a graphics processing system or graphics rendering output 120, e.g., the input frames 112 may be generated by the graphics engine of a video game. The GAN 100 also comprises a discriminator 104 trained concurrently with the generator to determine whether the candidate frames 114 produced by the generator 102 are 'fake' (i.e., have been produced by the generator) or 'real' (i.e., belong to the set of target images 110. The discriminator 104 is configured to accept candidate frames 114 and target images 110 as input, then outputs the predictions 106, which represent the discriminator's estimates as to whether the input images are 'real' or 'fake'. The accuracy of the discriminator's predictions 106 indicates how well the characteristics of the generated images 114 'match' the characteristics of the target images 110. This indication thus corresponds (when the input to the discriminator is a candidate frame 114 produced by the generator) to the generator's accuracy in transforming the input 112 to the candidate 114 to replicate the target images. For example, assuming that the discriminator is sufficiently expressive (that is, it has sufficiently many parameters and a sufficiently deep architecture) and converged, if the accuracy of the discriminator's predictions is low, this indicates that the discriminator is struggling to distinguish between generated candidate frames 114 and target images 110, and correspondingly the low discriminator accuracy indicates that the generator is performing well at transforming the input 112 to the candidate images 114 in a way that resembles the target dataset. On the other hand, if the accuracy of the predictions is high, the discriminator is able to distinguish between generated candidate frames 114 and target images 110 well, which indicates that the performance of the generator could be improved.

The output indication 106 is used as an input for an objective loss function 108, which generates a score dependent on the discriminator's output. The loss score, in the context of a GAN, may be called an 'adversarial loss' or an 'objective adversarial loss'. Generally, the intuitive significance of the adversarial loss is that it indicates to the discriminator how accurate it was at distinguishing between 'fake' and 'real' images. Correspondingly, the adversarial loss provides the generator with information about how effective it was at producing images resembling the target dataset. In this context, the term "resembling" may be taken to mean that a mathematically/statistically defined distribution of the candidate image 114 matches, or closely overlaps with, a similarly defined distribution of the set of target images. In practice, this distribution possesses a multidimensional feature space. The adversarial loss can then be used to train the generator and discriminator in a zero-sum game. The zero-sum game has two objectives: the discriminator's goal is to maximise the accuracy of its predictions, and the generator's goal is to minimise the accuracy of the discriminator's predictions by generating candidate images that more closely match the target image distribution. It will be understood here that the term 'zero-sum game' refers to a mathematical representation of a game having two sides, in which the advantage/gain of one side is equivalent to the loss of the other side.

The adversarial loss generated by the objective loss function 108 is used to define a backpropagation step for each of the generator 102 and the discriminator. The adversarial loss is thus used to update the parameters that control the discriminator, and parameters controlling any shaders currently being trained within the generator 102. Given the intuitive meaning behind the adversarial loss, in the backpropagation step for the discriminator 116, the parameters of the discriminator are updated in order to attempt to increase (e.g., maximise) the accuracy of the discriminator predictions, hence increasing the overall adversarial loss objective function. Correspondingly, in the backpropagation step for the generator 118, the parameters of one or more shaders within the generator (i.e., those currently being trained) are updated with the aim of reducing the accuracy of the discriminator's predictions by generating images having a distribution that is closer to the target set distribution, hence reducing (e.g., minimising) the adversarial loss objective function. The gradient 118 used by the generator to improve its performance (i.e. to increase the confusion of the discriminator) is backpropagated to it through the discriminator. As mentioned above, the shaders are separable and so can be trained individually, in subsets, simultaneously or sequentially. Thus, it is not necessary to train all shaders contained within the generator 102 (i.e., the frame transformation pipeline) at the same time. The generator backpropagation 118 may therefore affect only some of the shaders contained within in the generator 102. The process may then repeat, wherein one full cycle comprising processing of the input set 112 to generate one or more corresponding candidates 114 through to backpropagation steps 116 and 118 is known as one 'epoch'. The term 'epoch' also generally represents a full run through the entire set of training data during training. The training continues over multiple epochs until some exit condition is satisfied: for example, the parameters of the generator converge and are not updated any further, or simply a fixed number of epochs. Generally, the training operates 'offline', i.e., before the frame transformation pipeline is used to enhance rendered frames in a graphics processing embodiment. Consequently, the discriminator need not be optimised for efficiency.

As is described in the following in greater detail, the output of the discriminator 106 may output indications for multiple candidate frames 114 and/or multiple regions of one or more candidate frames. For example, each training cycle (epoch) may be based on a batch of input images 112 and a corresponding batch of candidate outputs 114. Further details of methods of training using the GAN of FIG. 1 are described with reference to FIG. 9. Generally, however, it should be appreciated that the present disclosure describes methods of training, and GAN architectures, that are particularly suited to using unpaired training data. The term 'unpaired' means that there is no predetermined or existent association or link between the input images and the training data. During unpaired training, a set of images 110 containing desirable characteristics to be imposed on the input dataset 112, but which do not have direct correspondence with the input dataset 112, is used as a target dataset 110. The generator (in this case one or more learnable shaders) learns to impose the desired characteristic(s) to the input images 112, such that, when applied, the learned characteristics of the target image 110 are replicated/mimicked in the candidate output 114. This is in contrast to using paired image data, which comprises having a set of training images, Y, having a direct correspondence to a set of input images, X. In other words, paired images each comprise an input image, and a corresponding transformed image where the nature of the transformation does not affect the general structure of the image, e.g. content of the image and placement of objects. An example of such a correspondence is that of roadmaps to satellite images. It will therefore be appreciated that using unpaired image data is preferable for training a transformation pipeline to replicate photorealistic images, because digital renders do not typically have a photographic counterpart captured by a physical camera. Using unpaired data however is not a necessary condition to train the transformation pipeline: the pipeline can still be trained on paired data, with the possibility of introducing common pixel-wise losses to the overall training objective.

Figure 2:
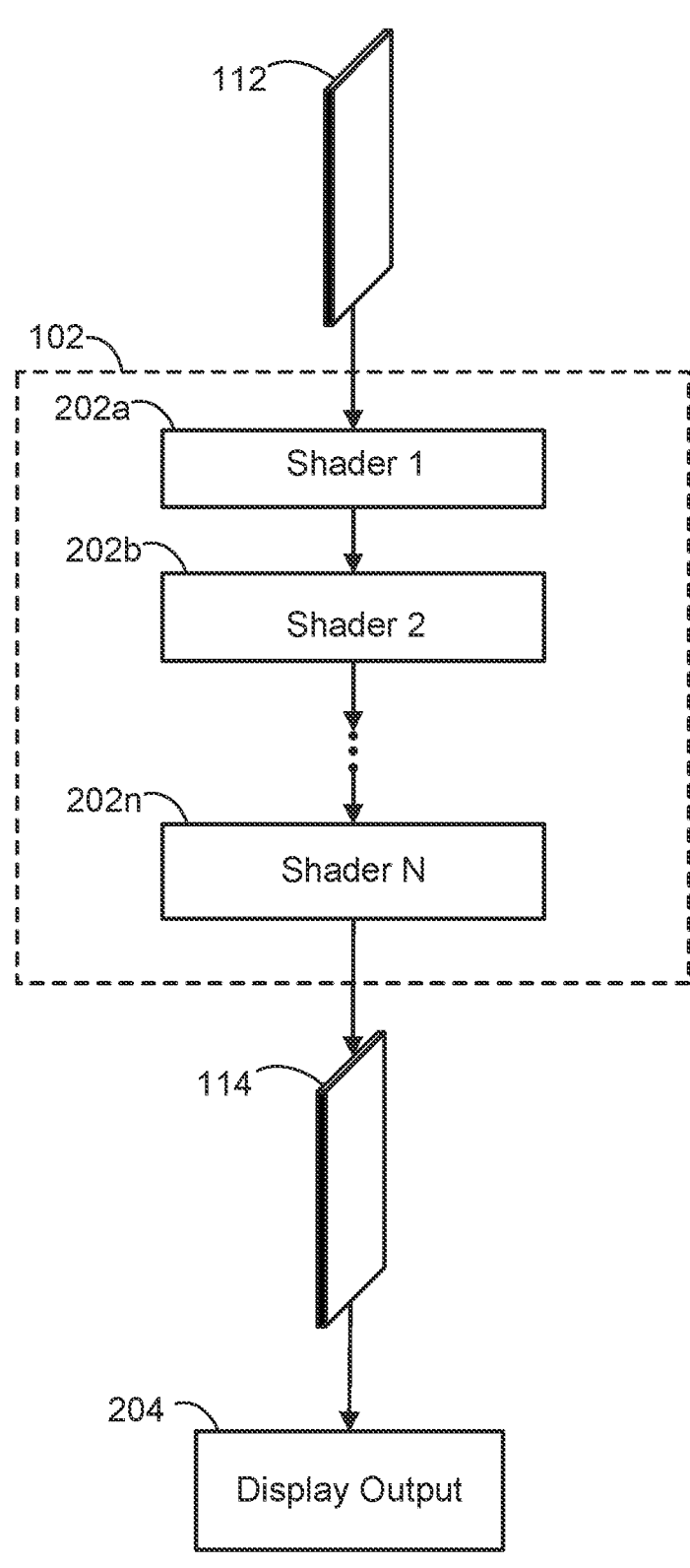
FIG. 2 shows the structure of an example trained frame transformation pipeline.

FIG. 2 illustrates a frame transformation pipeline 102 (i.e., corresponding to a generator 102 trained by the GAN of FIG. 1) configured to enhance rendered frames by imposing the visual characteristics exhibited in a set of target images onto a set of input rendered images 112. During use, the input image 112 (which is a rendered frame produced by a graphics processing system) is subjected, in turn, to each of the shaders 202a, 202b . . . 202n. Each shader 202 is defined by some mathematical function or algorithm with behaviour determined by parameters that have been learned during training, e.g., by the training effected by a GAN. The algorithm or function of each of the N shaders is applied to the input image 112, i.e., such that N−1 intermediate images are produced during operation of the frame transformation pipeline 102. The shaders may be applied consecutively, i.e., one by one. In other examples, some shaders may be configured to operate in parallel with other shaders, depending on the nature of the shader's task (e.g., depth of field shader). The resulting image is output frame 114, which is enhanced relative to input frame 112 to exhibit the visual characteristics of the set of target images (having been imposed by the shaders). After the output frame 114 has been produced by the pipeline 102, it may be output for display 204. The frame may be output immediately in this regard, or, as mentioned above, the pixel/vertex values of the enhanced image 114 may be read back into the GPU as the texels of a texture before being re-processed and applied to fragments of a new, post-processed, image.

Generally, the shaders 202a, 202b, 202n may be applied one by one, i.e., consecutively (though there are exceptions described below). In particular, since the shaders are preferably selected to be orthogonal, they may be applied in any order. In some examples, however, a particular order may be preferred. For example, in the case that the visual effect imposed by each of the shaders is representative of some physical phenomena (e.g., physical phenomenon associated with an image-capture process), the shaders may be applied in an order corresponding to an order in which the physical phenomena would, in reality, occur. For example, in photography, the light of a scene is affected by the lens before being affected by the camera sensor. Thus, shaders designed to replicate lens-based phenomena may be applied to an input image 112 before shaders designed to replicate sensor-based phenomena. Such an order may be chosen such that the shaders more realistically impose the visual characteristics, i.e., by applying the shaders in an order that mimics the reality of the physical characteristics that are modelled. Thus, advantageously, the frame transformation pipeline can be designed not only to impose particular visual characteristics representative of individual phenomena, but also to impart/replicate any hysteresis that may be associated with a set of ordered physical phenomena.

One or more shaders may be used to replicate the salient visual characteristics of a set of target images, e.g., where the target images comprise a set of photographs and the aim is to enhance frames to be photorealistic. Moreover, in contrast to the conventional approach of training a neural network having many parameters, embodiments of the present disclosure enable a modular selection of single-function shaders. This deliberate selection means that salient characteristics of the target data can be effectively and efficiently extracted. Furthermore, shaders can be trained and/or tuned separately to provide an optimum balance of visual characteristics that most authentically replicates the target dataset. Yet further, different shaders may even be trained on separate sets of target data, given that the shaders have separate, orthogonal functionality, and combined into a single pipeline 102.

The small number of parameters used to control the shaders in the frame transformation pipelines confers the further advantage that the pipeline is unlikely to 'overfit' to the target data during training. Neural networks having many parameters, by contrast, are likely to overfit the target data because large networks are trained to uniformly replicate all characteristics of target data without discrimination, and are deliberately parameterised and unconstrained such they may learn all features of a target dataset. The term 'overfit' here has its usual meaning, i.e., where a model is (usually inadvertently) trained to adopt all specific features—including noise and anomalous features—of training data such that the model does not generalise to new data. Consequently, heavily parametrized neural networks are more difficult and time consuming to train: i.e., a large set of target data may be required to avoid overfitting, and additional time-consuming training steps, e.g., cross-validation, may be required. Fully parametrised networks prone to overfitting thus do not generalise well, i.e., produce inconsistent results when applied to an input that has different features to the data on which the network was trained. By contrast, embodiments of the present frame transformation timeline generalise well to new data because the shaders are mathematically arranged to learn only particular characteristics of data, such that it is mathematically unlikely, or even impossible, for the shaders to replicate visual characteristics for which they were not designed.

Nevertheless, it will be appreciated that there is no limit to what a trained shader or set of shaders can impose. For example, once trained, shaders can be combined into a single unit or compute kernel that performs multiple functions, i.e., imposes multiple visual characteristics. Additionally, a shader that performs a single function, e.g., a bloom shader, once trained, may be split up into multiple kernels/sub-shaders within a frame transformation pipeline. In other words, it should be appreciated that the boundaries of the shaders may differ between training and deployment. Once trained, individual shaders (i.e., having been trained to impose a particular visual characteristic) may be combined to form a unified shader, e.g., a single compute kernel that operates as if it were a single shader. Thus, in some examples, one 'shader' may actually be configured to impose multiple particular visual characteristic. Generally, multiple stages/shader may be merged together into one shader, or split one step into multiple shaders/compute kernels. It will therefore be appreciated that shaders undergoing training and deployed shaders can have different functionality. Trained shaders can be merged prior to deployment in a frame transformation pipeline for various performance considerations, to keep frame or image data local in cache/registers.

FIG. 2 illustrates a frame transformation pipeline 102 containing bespoke trained shaders. The term 'bespoke' should be interpreted as designed and/or configured to perform a specific or definable function. Compared to a neural network, the pipeline has the advantage of achieving similar results while being viable for use in real-time applications. Some types of problems, however, are difficult to solve using a bespoke shader, e.g., where the function to be applied is not easily defined. In this case, small neural networks can be implemented in the pipeline, either in conjunction with existing shaders or as additional shader modules, to solve such problems, and reduce engineering effort (i.e., reduce the effort of designing or training a shader to impose some characteristic that is not easily definable). Thus, up to N supplementary neural networks may be implemented in a pipeline 102 having N shaders. Example functionalities of a supplementary neural network that can be implemented as an independent shader include: image inpainting, retexturing of objects rendered in the input frame, and enhancing the realism of complex effects such as foliage and human skin. A neural network can also be used to augment a bespoke shader, e.g., by adapting the parameters of a shader. Such a network may be termed a parameter-adapting neural network or a locally adaptive neural network. Generally, such networks may be arranged to modify at least some of the parameters of a shader based on a local context of the input image. Consequently, such neural networks are arranged to modulate the behaviour of shaders based on local context. An example would be a locally adaptive bloom shader, where a neural network can be used to augment the method described below with reference to FIG. 5, for example by adapting the threshold depending on local context. A neural network shader can also be implemented to work in conjunction with the whole pipeline of shaders. Such a neural network shader can be used to capture nebulous traits of the target dataset and augment the output of the entire designed shaders pipeline. It will be understood that the addition of supplementary neural networks, whether they are designed to augment shader or operate on the whole pipeline, will not violate modularity or separability of the shaders.

Using a pipeline of bespoke shaders instead of an undifferentiated neural network presents several technical advantages such as modularity and interpretability. As mentioned, such advantages will not be violated if small supplementary neural networks are implemented in any of the methods described above. Modularity can be preserved by training any combination of shaders and neural network shaders separately. Interpretability can be maintained, for example, by designing neural networks that are constrained to learn a well-defined task. In the case where neural networks are used to augment a bespoke shader, the networks' tasks will be further constrained by the context/architecture of the existing shader.

Networks constrained to a well-defined task can be implemented using only a few layers, and a small number of parameters. This means that such neural network-based shaders can still be supplemented to the frame transformation pipeline without having a detrimental impact on the runtime of the frame transformation pipeline 102, which may still be orders of magnitude more efficient than a large undifferentiated neural network and thus allows for real-time rendering applications. Furthermore, to limit the increase in runtime, the implementation of neural network shaders in the pipeline may be reserved for cases where there is not a clear alternative algorithm that can be used in a bespoke shader, e.g., where there is a visual characteristic that cannot easily be defined (e.g., mathematically or otherwise).

Figure 3:
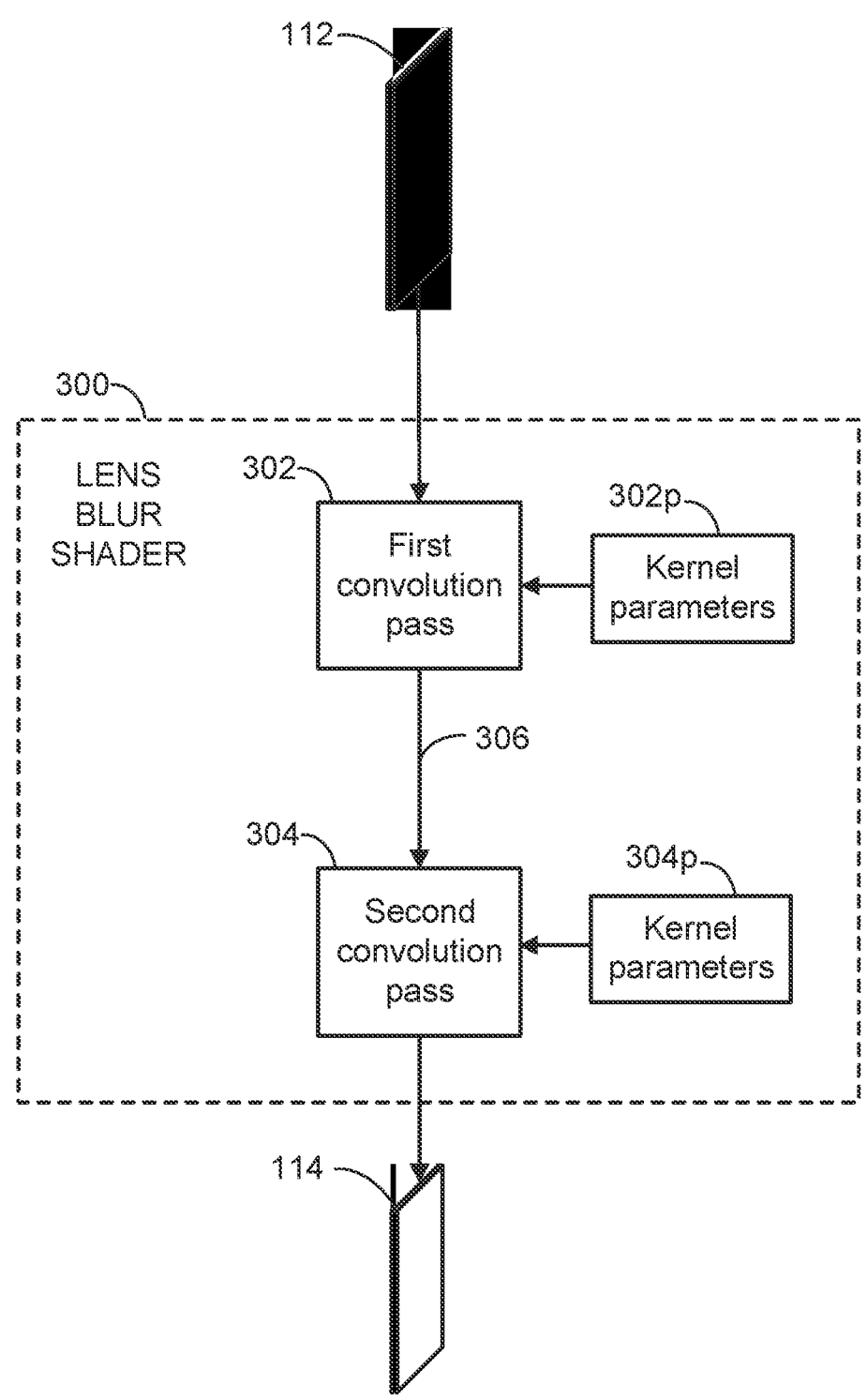
FIG. 3 shows a diagrammatic structure of a lens blur shader.

FIG. 3 shows a flowchart illustrating an example algorithm of a lens blur shader 300. Generally, lens blur shaders imitate the blurriness caused by the point spread function (PSF) that is an artefact of lenses. Rendered outputs may contain aliasing artefacts resulting for example from point sampling of geometry, which may be improved or mitigated by the use of a lens blur shader. Given this anti-aliasing property, the lens blur shader of this form has the added benefit of providing a computationally "cheap" anti-aliasing function: i.e., the lens blur shader may obviate the need for a graphics processing system to implement a complex and/or costly anti-aliasing function during rendering.

The present lens blur shader is preferably implemented as a separable convolution. This comprises of a first kernel that applies a first convolution, and a second kernel that applies a second convolution. In some implementations, the first convolution is horizontal, and the second convolution is vertical. In other examples (not shown), lens blur may be applied as a single convolution pass using a single, non-separable kernel, however performing the lens operation in two passes (where the kernels are separable) allows for fewer calculations to calculate the output, thus resulting in a faster implementation, especially for kernels with larger radius. The input frame 112 in this example is an RGB image, i.e., comprising an array of RGB values and thus having dimensions $3 \times H \times W$ (that is, 3 channels, H rows and W columns). The output, as with the final output of all shaders in the present disclosure, has the same dimensions of $3 \times H \times W$. The ordering of dimensions may differ between implementations.

The first pass convolution 302 involves applying a first kernel with N kernel parameters 302$p$, contained in a $1 \times N$ vector, Kh: $[Kh_1 \ Kh_2 \ldots Kh_N]$. In one example, the kernel may contain five parameters. The result 306 of the convolution between the input RGB image and Kh is an intermediate frame 306, also having dimensions $3 \times H \times W$. The second convolution 304 involves applying a second kernel that has five kernel parameters 304$p$ in a $N \times 1$ vector, Kv: $[Kv_1 \ Kv_2 \ldots Kv_N]$. Again, merely in one example, the kernel may contain five parameters. The result of the second convolution is the output image frame 114. The total of 2N kernel parameters, i.e. parameters of the horizontal kernel 302 and the vertical kernel 304, are updated by the generator backpropagation step 118, e.g., by a GAN as illustrated in FIG. 1. It will be appreciated that, although FIG. 3 labels the input and output frames consistent with FIG. 2, this is simply to indicate that the shader is configured to operate in a frame transformation pipeline in isolation. However, in general, the lens blur shader may be used in combination with several other shaders, thus the input frame (labelled 112 in FIG. 3) to the lens blur shader may in practice be the output of one more previous shaders. Similarly, the output of the lens blur shader may be used as the input to one or more subsequent shaders.

Optionally, the kernels may be constrained to be low pass filters (e.g., by forcing parameters to assume a positive value) and to leave the overall intensity of the image unchanged (e.g., by normalising parameters to sum to 1). Normalisation helps preserve orthogonality, since other image characteristics such as intensity/brightness are left unchanged. This could be implemented using a Softmax function. This optional low pass filter can improve training stability. Nevertheless, training stability can be improved in other ways, e.g., by adding random noise to the discriminator or by constraining the learning rate of the discriminator. Thus, the addition of a Softmax may not be needed to yield a stable training rate. However, the Softmax is desirable in some cases, e.g., when it is desirable or required that the lens blur should not behave as a high pass filter. Similarly, rotational symmetry can be imposed on the learned kernels in the case where the lens blur filter should not introduce any pixel shift on the output image. In cases that the Softmax is used for this purpose during training, it should be noted that only the transformed values (i.e. the output of Softmax) are used during deployment. In some cases the same parameters may be used for both passes.

As mentioned, the addition of lens blur can enhance photorealism of renderings by replicating the behaviour of the point spread function of a lens (on a digital or film camera). The lens blur shader is not restricted to embodiments of replicating photorealism however; as mentioned, it may be used as a cheap anti-aliasing function. In an alternative example, a square kernel (i.e., N×N, for example a 5×5 kernel) may be convolved with the RGB image, and again updated via backpropagation. Generally, the kernel(s) do not heavily distort the input rendered image, but merely impose a light blur. Preferably, the kernels are initialised as a unit impulse, $\delta(x, y)$, (e.g., in the case of a square kernel, the identity matrix), where a normally distributed noise X with $\sigma=10^{-3}$ may be added to the (initial) weights to help break symmetry. Thus, kernels may be initialised as:

$$K = \delta(x, y) + X, \text{ where } X \sim N(0, 10^{-3})$$

To maintain the orthogonality between the lens blur and other shaders, the kernels' weights may be normalised after each update so that they do not affect other, global, image characteristics. For example, the kernels' weights may be normalised so that the lens blur does not modify the image intensity, thus, the output pixel values will still be in the range between 0 and 1.

Figure 4:
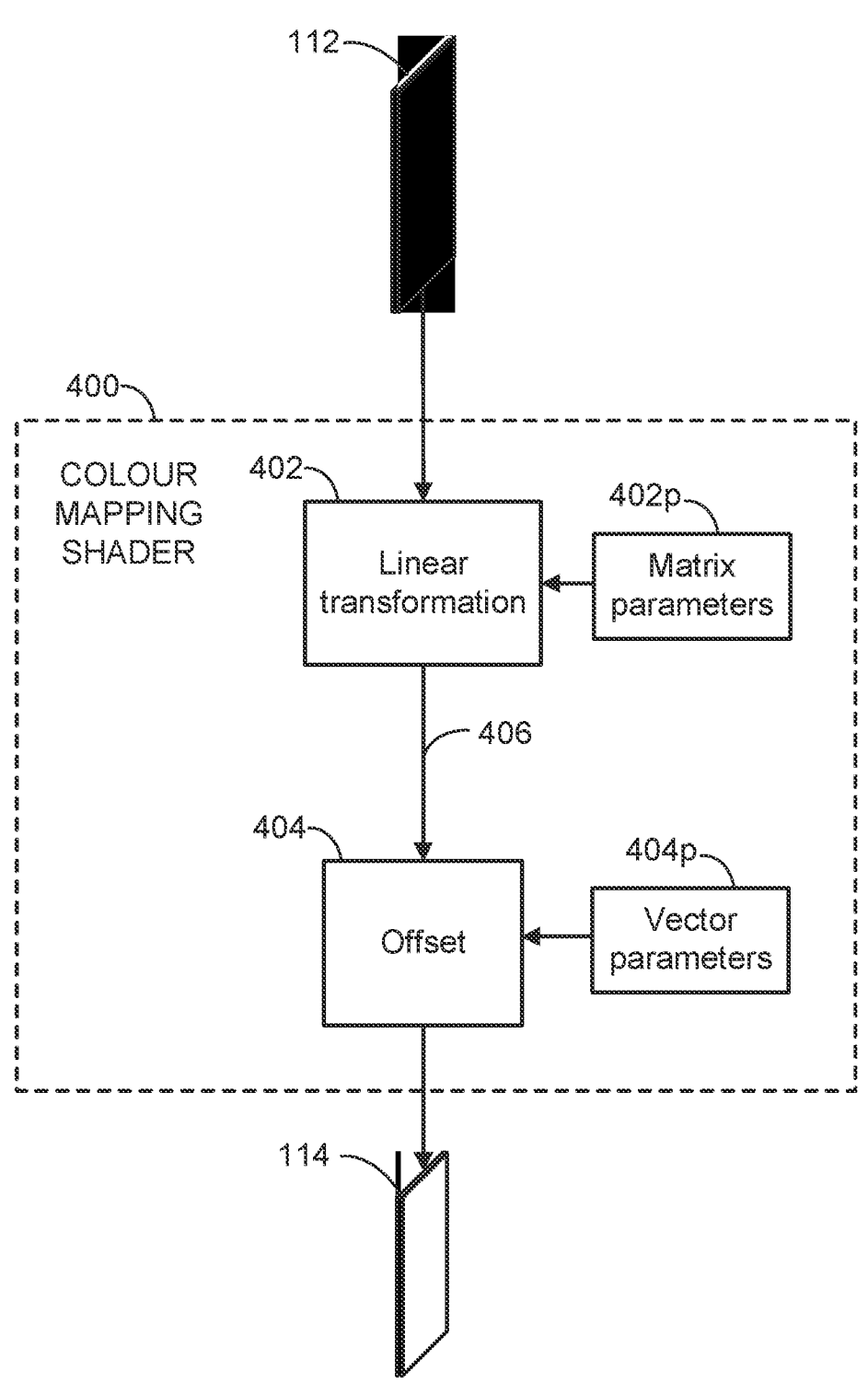
FIG. 4 shows a diagrammatic structure of a colour mapping shader.

FIG. 4 shows an example algorithm used for a colour mapping shader 400. The colour mapping shader is used to impose global characteristics onto the input frame 112 (e.g., brightness, contrast, saturation . . . ) dependent on the global characteristics typical of the target dataset. Thus, this generally comprises applying an affine transformation to the input image. The parameters of the colour mapping shader, when trained using the GAN 100, are updated so that the shader learns to match the characteristics of the target dataset. The shader may apply a single matrix transformation, or may apply a linear (matrix) transformation followed by a translation or offset (that is, the overall colour mapping may be affine). The latter alternative is illustrated in FIG. 4.

The input frame 112, containing an array of RGB values and thus having dimensions 3×H×W, is first subjected to a matrix transformation 402. The transform is defined by a 3×3 matrix, M, having up to nine matrix parameters 402p:

$$\begin{bmatrix} m_{11} & m_{12} & m_{13} \\ m_{21} & m_{22} & m_{23} \\ m_{31} & m_{32} & m_{33} \end{bmatrix}$$

The transformation results in intermediate frame 406, also having dimensions 3×H×W. In the FIG. 4 example, the intermediate frame is then subjected to an offset 404, e.g., a translation, defined by a 3×1 vector, t, having parameters 404p:

$$\begin{bmatrix} t_1 \\ t_2 \\ t_3 \end{bmatrix}$$

The training of the colour shader as shown in FIG. 4 comprises updating the matrix parameters 402p and the three vector parameters. Specifically, each element of the matrix and vector is updated through backpropagation 118 of the GAN, during training. The matrix parameters generally control global characteristics including, for example, colour balance, brightness, contrast, and saturation. In order to allow the shader to learn colour translation in addition to the above global characteristics, the vector (i.e., offset 404) may optionally be included, and would be applied after transformation.

Consequently, if the RGB vector at each position of the input image 112 array is defined as $C_{x,y}$, and the RGB vector at each position of the output image 114 array is $C'_{x,y}$, the mapping applied by the colour mapping shader 400 may be defined as:

$$\begin{bmatrix} R'_{x,y} \\ G'_{x,y} \\ B'_{x,y} \end{bmatrix} = \begin{bmatrix} m_{11} & m_{12} & m_{13} \\ m_{21} & m_{22} & m_{23} \\ m_{31} & m_{32} & m_{33} \end{bmatrix} \times \begin{bmatrix} R_{x,y} \\ G_{x,y} \\ B_{x,y} \end{bmatrix} + \begin{bmatrix} t_1 \\ t_2 \\ t_3 \end{bmatrix}$$

The parameters of the shader are preferably initialised, prior to training, to have nil effect; thus, the matrix, M, may be initialised as the identity matrix, and the vector, t, may be initialised with zeros. As with the blur shader, the parameters may also include a small noise component to help break symmetry. In a preferred embodiment, it is desired that the output of the colour mapping maintains a pixel value range between 0 and 1. To impose this constraint, the following loss calculated on the colour mapping output can be added to the training objective of the pipeline:

$$L_{colour} = \text{mean}(\max(R'G'B', 1.0)) - \min(R'G'B', 0.0)) \times \alpha$$

where α controls the magnitude of the penalty imposed by the loss. By minimising the term $L_{colour}$, the colour mapping output values can be constrained between 0 and 1.

Figure 5A:
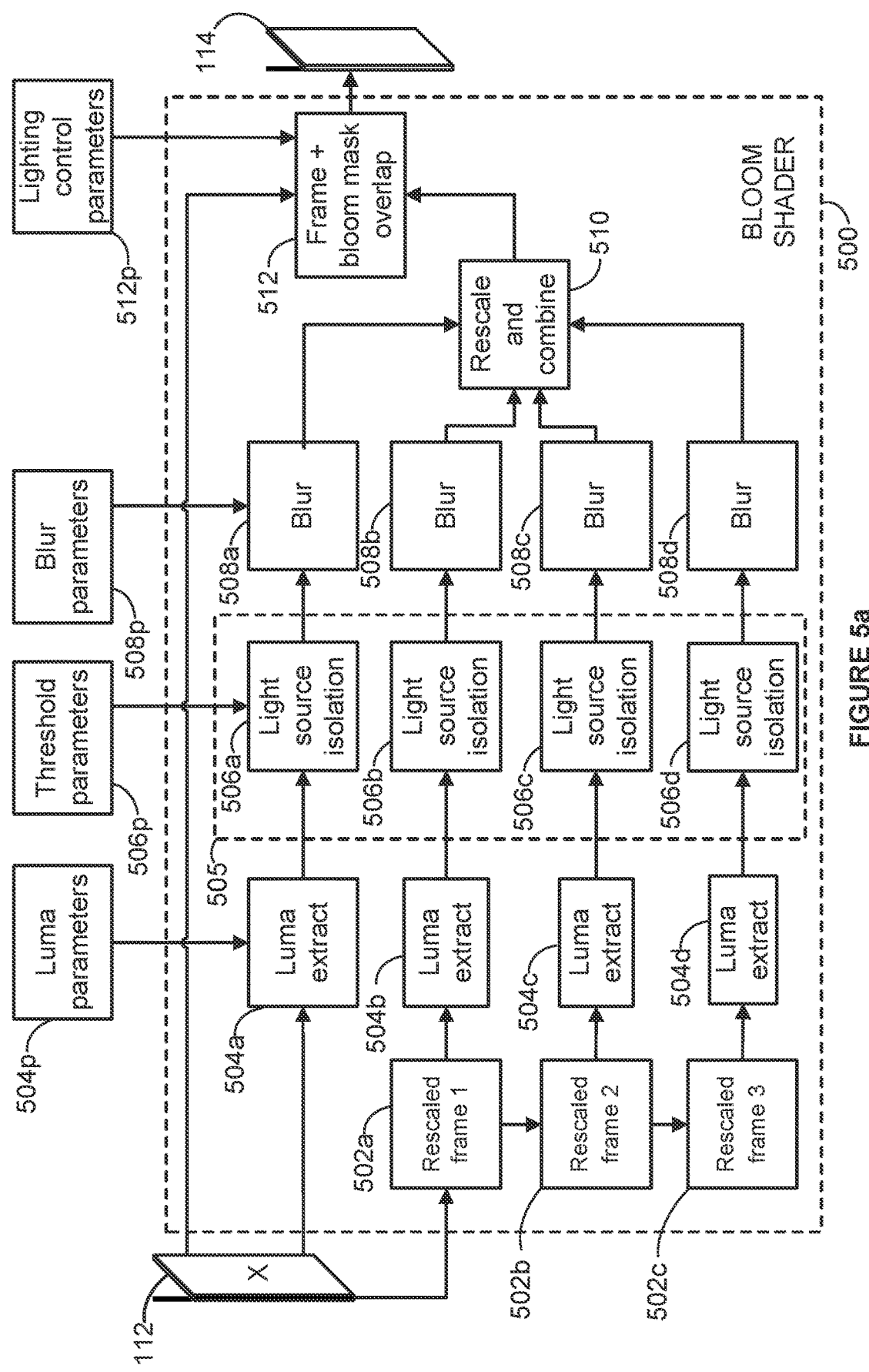
FIG. 5a shows a diagrammatic structure of a bloom shader.

FIG. 5a shows a diagrammatic structure of a bloom shader 500. The bloom shader 500 is implemented to replicate light artifacts that sometimes occur in physical image-capture devices, e.g., cameras. Specifically, bloom replicates the effect of light "bleeding" caused by strong light sources (or strongly lit objects) in a scene, e.g., caused by bleeding due to oversaturation in an image-capture system. The bloom phenomenon occurs in physical captures in scenes with a high dynamic range, relatively long exposure and/or high gain, and generally when a bright object is in the scene. One mechanism by which the effect occurs is that the light intensity sampled by the camera sensors is too high, and so the light spills to neighbouring pixels in a camera sensor. Broadly speaking, the bloom shader replicates this visual image characteristic by first isolating the bright regions of a frame (e.g., light sources), applying blur to the isolated light sources to re-create the bleeding effect, and re-applying this blurry light mask to the original image. The blurring effect may be imparted using a Gaussian blur to simulate the 'light bleeding' effect. In the present example of FIG. 5a, this is done at different resolutions concurrently to improve performance and execution speed, as well as improving the realism of the bloom effect. The downscaled, isolated, and blurred frames for each resolution are then each rescaled to the original resolution and combined, where the resulting combination represents a bloom 'mask'. The bloom mask is then combined with the original image frame 112 to obtain the output image 114.

The advantage of generating the bloom mask at multiple resolutions is to help model the blur effect of the bloom over greater distances in the image, i.e., to model the bloom at different scales. For example, a bloom filter applied at a downscaled resolution (e.g., one eighth resolution) can more effectively impose bloom over the whole image, and do so in a more computationally efficient way (i.e., compared to a global filter that operates over the full resolution of the image at a global level). Different bloom parameters (504p, 506p, 508p, 512p) corresponding to each stage of the bloom mask generation may therefore be learned for each resolution. In other words, the bloom parameters (504p, 506p, 508p, 512p) for each stage may be split into sub-groups of parameters corresponding to each resolution used.

The rescaling stage of the bloom filter comprises downscaling/downsampling the input frame 112 into a plurality of lower resolutions. Three downscaled resolutions 502a, 502b, 502c are used in the FIG. 5 example, though a different number may be used depending, e.g., on the speed required of the shader. The frames are preferably rescaled at powers of two, e.g., to ½, ¼, and ⅛ of the full resolution of 3×H×W. Thus, in this example, the downscaled frames have resolutions of: 3×(H/2)×(W/2) (rescaled frame 1 502a), 3×(H/4)×(W/4) (rescaled frame 12 502b), and 3×(H/8)×(W/8) (rescaled frame 3 502c). No parameters are used/learned to encode the downscaling. Preferably, to reduce the bandwidth of the shader and thus improve efficiency, successively downscaled resolutions are calculated sequentially. In other words, the output of each rescale is used as input to the next rescale to reduce bandwidth and processing time when the bloom shader is deployed (i.e., the downscaled samples are chained together, rather than always operating on the full-res image).

The 'Luma extract' stage comprises obtaining the luma channel, which is used in the next stage to isolate the brightest regions of the input frame. The luma channel of an image represents a brightness of the image, and thus represents an achromatic (i.e., greyscale) portion of the image. The luma value at each position $Y_{x,y}$ may be obtained by calculating the dot product between the RGB vector at each position $C_{x,y}$ and a vector L containing a learnable weight for each channel:

$$Y_{x,y} = \underbrace{[\begin{matrix} R_{x,y} & G_{x,y} & B_{x,y} \end{matrix}]}_{C_{x,y}} \cdot \underbrace{\begin{bmatrix} W_R \\ W_G \\ W_B \end{bmatrix}}_{L}$$

The resultant image, Y, has dimensions of 1×H×W for an input, X, having dimensions 3×H×W. It will be understood that each resolution has its own learnable set of parameters for vector L. In one particular example, the parameters for L are initialised with the values used to calculate Luma according to a common RGB to YUV (Luma channel) conversion: ($W_R$=0.299, $W_G$=0.587 and $W_B$=0.144). Each set of parameters, however, can be updated during training, regardless of the initialisation used. For this reason, rather than using luma, the shader can instead learn to use an isolated/a mix of the RGB channels to select brighter regions of the input frame. After the weights are updated, a Softmax operation may be used to keep the sum of the parameters to 1, and make sure that all the parameters are positive. Note that, as with the blur shader described above, the Softmax is intended to be applied before deployment. It should be appreciated that order of steps for producing the bloom mask is not restricted to the exemplary order illustrated in FIG. 5. In other examples, it is possible for the luma extraction (504) to be applied only to the original resolution frame, and thus to precede the downsampling (502). This alternative order may be more efficient in terms of bandwidth, execution time and power consumption. This may be because, for example, the downsampling (502) operates in the YUV space, and thus luma is downsampled at the same time as the chroma.

The next stage 505 involves applying a threshold filter to extract the brightest portions of the Luma channel to generate a bright pixel mask, Y'. Generally, the bright portions of the luma channel are extracted such that the resulting bloom mask is representative only of the pixel values that meet or exceed a particular threshold. The intuition behind this step, in terms of replicating the light bleeding phenomenon, is to isolate only the portions of the images that would be bright enough to cause light bleeding on a physical camera. The extracted bright pixel mask may then be reapplied to each of the original frames (i.e., for each resolution at which the luma was extracted). Generally, any suitable filter may be used to extract the bright parts of the luma channel. In one example, a sigmoid threshold is used. Thus, for each resolution (including the original resolution) the bright portions of the luma channel are extracted at 506a, 506b, 506c, 506d. The isolated luma channel, denoted Y', is obtained as by applying the following sigmoid function:

$$Y' = \frac{1}{1 - e^{-b(Y-a)}}$$

where a and b are learned parameters (where each resolution has its own a and b parameters that may be learned). Parameters a and b are scalars that help the sigmoid function learn the optimum threshold at which to isolate bright pixels.

The bright pixel mask, Y', has the same dimensions as the luma channel Y, i.e., 1×H×W.

Generally, the same block structure for applying the threshold to isolate the bright luma pixels is used. Nevertheless, an alternate threshold to the sigmoid may be used in other examples, for example a rectified linear unit (ReLU) function. This ReLU threshold may be applied as:

$$Y' = \max(0, Y - c)$$

where c is a parameter to be learned. The advantage of the ReLU unit is that it is more efficient to execute (i.e., once trained) than the sigmoid function, and provides similar results.

Figure 5B:
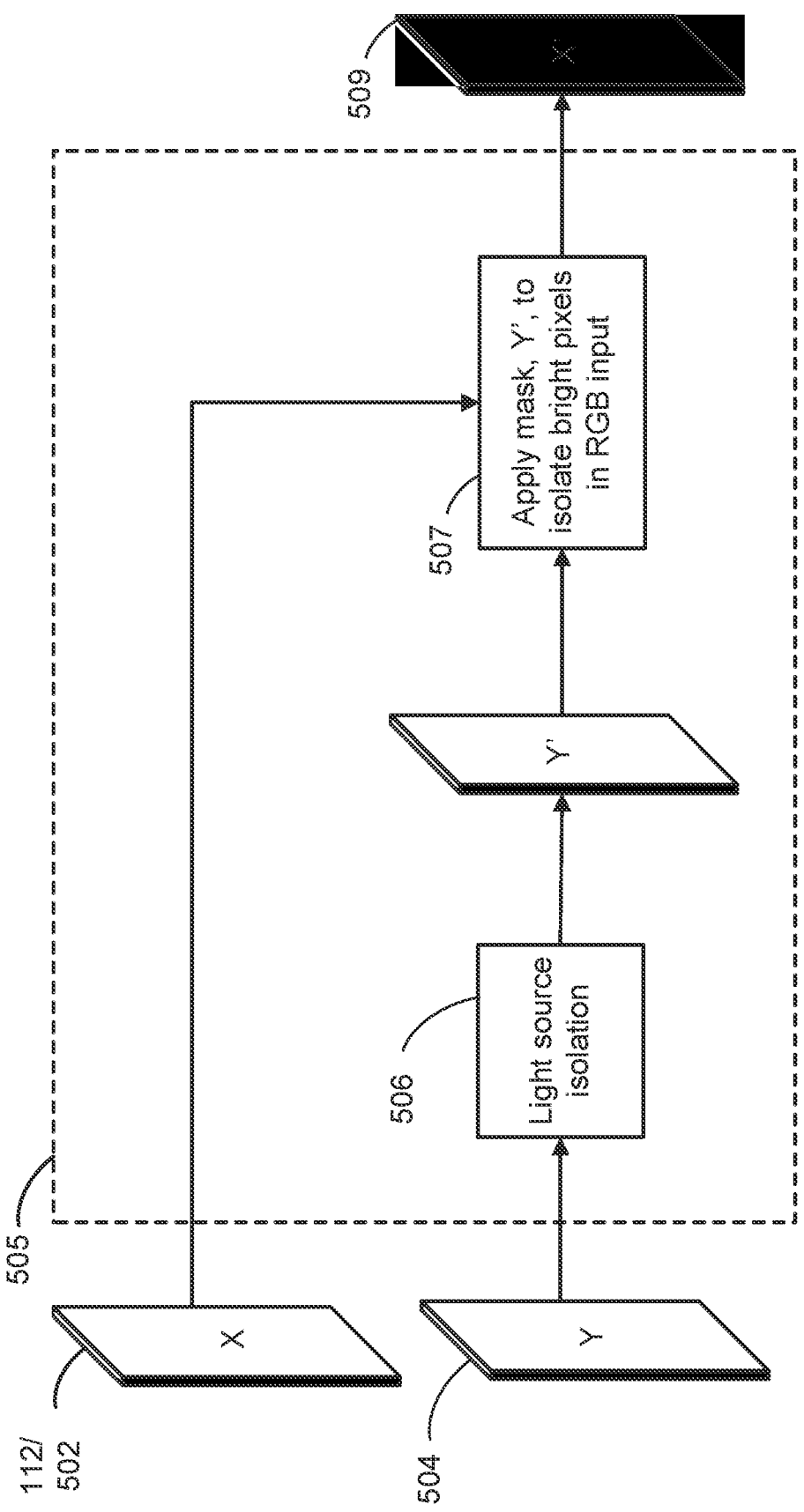
FIG. 5b shows a sub-algorithm within the bloom shader for extracting and applying a bright pixel mask.

FIG. 5b illustrates the sub-routine 505 of extracting the bright pixel mask and subsequently applying the mask to the original RGB frame, X (where X represents the RGB image at each given resolution, i.e., including the original resolution and all downscaled resolutions 502a, 502b, 502c). After obtaining the bright pixel mask, Y', the mask is applied 507 to the RGB input, X, i.e., by the elementwise product: X'=X⊙Y' broadcasted over each RGB channel in X. Consequently, the result is frame, X', having the same dimensions as its respective input X (for each different resolution used), i.e., 3×H×W. The resultant frame X', 509 represents colour (RGB) image with the brightest portions extracted, according to the threshold filter used.

Following the bright pixel extraction of the original colour input at 505, a blur is applied (508a, 508b, 508c, 508d) to the resultant colourised bright pixel mask 509 using a set of blur parameters 508p (described below in detail). In the present example, a Gaussian blur is applied, which is applied using two kernels in a separable manner (i.e. with separate horizontal and vertical passes). The blur is applied to the colourised bright pixel mask 509 to replicate the bleeding light behaviour of bloom. The first kernel, $G_x$, is a 1×5 vector that applies a first convolution pass (blurring horizontally), and the second kernel, $G_y$, is a 5×1 vector that applies a second convolution pass (blurring vertically). The kernels are sampled from a discrete Gaussian function as follows:

$$G_x(x, \sigma_x) = e^{-\frac{x^2}{2\sigma_x^2}}$$

$$G_y(y, \sigma_y) = e^{-\frac{y^2}{2\sigma_y^2}}$$

The weights sampled to construct the kernels are normalised and the two convolutions are applied as follows:

$$Z = X' * \lambda G'_x(x, \sigma_x)$$

$$A = Z * \lambda G'_y(y, \sigma_y)$$

Here, * is the convolution operator, and $G_x'$ and $G_y'$ are the discretely sampled and normalised versions of the Gaussian kernels (e.g. for horizontal and vertical filtering) respectively. The parameters controlling the spread/extent of the Gaussian, $\sigma_x$ and $\sigma_y$, are learned during training to control the optimal horizontal and vertical blur component. The additional parameter of $\lambda$ may be used to control the strength of the bloom magnitude, so that the shader can control the contribution of each bloom resolution on the output image, thus emphasising bloom characteristics belonging only to particular resolutions. It will nevertheless be appreciated that kernels with dimensions other than 1×5 and 5×1 may be used to apply the Gaussian blur to the colourised bright pixel mask 509: i.e., a 1×N and N×1 kernel or a non-separable blur may be used. Furthermore, the kernels may be defined as general convolutional operators, where, similarly to the lens blur, each weight is learned independently.

The next step 510 involves rescaling each of the downscaled 508b, 508c, 508d frames' masks, A, to the size of the original image 112 and combining them (e.g., summing them together) to provide a final bloom mask, $A_{combined}$, again having dimensions of the original input frame 112. The output of the rescaling and combination of these masks represents a bloom mask. The bloom mask, $A_{combined}$, is then summed 512 to the original image frame 112 (X) to generate the final output, $X_{Bloom}$. The blending between the input frame 112 and the bloom masks can be achieved by applying a tone mapping curve to $X_{Bloom}$, which compresses the pixel values in $X_{Bloom}$ between 0 and 1 while also maintaining the dynamic range provided by the bloom masks. The tone mapping curve is parametrised by a scalar exposure parameter, $\varepsilon$, which controls the rate at which pixels get compressed. A scalar saturation parameter, 's', controls the saturation point of the curve. These are learned during training in order to achieve a compression mapping that reproduces the bloom present in the target set. The final output frame is then obtained as:

$$\text{Output} = \min\left(\left(\frac{e^{\varepsilon s}}{e^{\varepsilon s} - 1}\right)\left(1 - e^{(-X_{Bloom}\varepsilon)}\right), 1\right)$$

The lighting control parameters 512p, unlike the preceding parameters (504p, 506p, 508p) do not have sub-groups of parameters for each resolution, because the $X_{Bloom}$ bloom mask represents the combination of all resolutions used. It will therefore be appreciated that the lighting control parameters 512p are the only parameters in the bloom shader 500 that are shared between the different resolutions. As mentioned, the shaders may be trained by the GAN 100 individually (sequentially), or may be trained simultaneously in any given combination or permutation. The inventors have established that the bloom shader 500 performs best (e.g., yields the most realistic results) when trained with the colour mapping shader 400.

Figure 6:
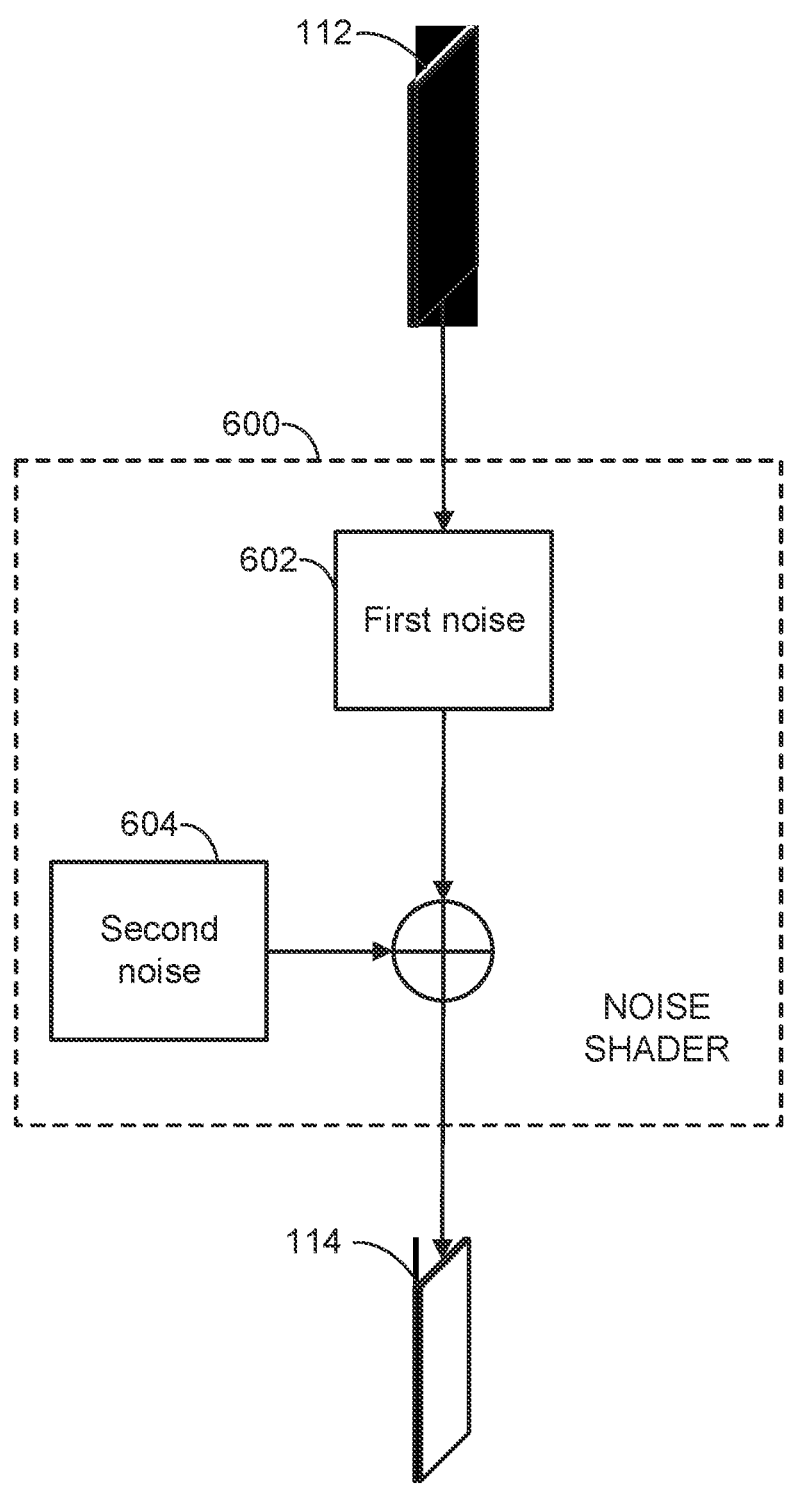
FIG. 6 shows a diagrammatic structure of a noise shader.

FIG. 6 shows a structure of a noise shader 600. This shader 600 replicates the noise intrinsic to image capture using typical digital camera sensors. For example, sensor noise would be especially visible/prevalent for images taken in low light conditions and/or high gain. It will be appreciated that the noise shader is not restricted to representing sensor noise, and may also replicate similar visual effects or artefacts such as the 'grain' of photographic film. Generally, the noise shader is configured to apply one or more randomly distributed perturbations to at least some pixel values of the input image. The effect of the shader may be achieved by first modelling the photon capture process at 602 as sampling from a Poisson distribution p(λI), which has a single learnable parameter λ applied to the input intensity (this is referred to in the art as the conversion gain). This may be approximated by a normal distribution with mean and variance both set to λI. Zero-mean Additive White Gaussian Noise (AWGN) is then generated 604 and added to the output of the photon capture noise model to represent other noise sources intrinsic to image capture, such as read and thermal noise. Again, this second noise 604 has a single learnable parameter, which in this case corresponds to the variance of the normal distribution. The noise shader 600 learns values for the parameters of the noise distributions that reproduce the noise present in the target set. It should therefore be appreciated that the noise shader 600 is sampled from the distributions described above, but does not apply the distributions themselves.

When applying the shader 600, the first noise distribution 602 is first applied to the input frame 112, and the resulting intermediate frame (having the same dimensions as the input frame 112) has a second noise distribution added to it. For performance reasons, both operations (602, 604) may be done on the same pixel before processing the next, rather than sequentially as illustrated in FIG. 6. Preferably, the first distribution is Poisson distributed noise, and the second, additive, noise distribution is normally distributed. In addition, a gain parameter may be included to represent amplifier gain of a sensor; in other words, to control the amplification of the imposed noise. When used in conjunction with other shaders, the sensor noise shader 600 is preferably applied at the end of the pipeline (or, more generally, after each of the lens blur, colour mapping, and bloom shaders). Consistent with FIG. 5 the sensor noise is generally applied as:

$$Y = \frac{P(\lambda X)}{\lambda} + N(0, \sigma^2)$$

where X represents the input frame 112 and Y represents the output frame 114. For the implementation described above, it is assumed that X is in linear RGB colour space. $N(0, \sigma^2)$ is used to model the AWGN to be added to the output image. The distribution parameters $\lambda$ and $\sigma^2$ are updated during training so that the shader can learn to introduce the correct quantity of each type of noise. $P(\lambda X)/\lambda$ is used to model the photon capture process.

It will be appreciated that many other types of shaders may be implemented in combination with any one or more of the presently described shaders. For example, although the mathematical form of the functions for defining other shaders is not provided, other possible shaders could be formulated to impose any of the following visual characteristics that are representative of physical phenomena in an image-capture process: chromatic aberration, comatic aberration, spherical aberration, bokeh, astigmatism, tone mapping, colour grading, and the like. Although the shaders presented here use the RGB data provided by the rendered frames, other metadata belonging to the scene from which the frames have been rendered could be used to implement and/or improve the performance of other shaders. For instance, depth information could be used as an auxiliary input to shaders that implement a bokeh effect or distance-dependent falloff, such as fog. Additionally, a shader could use motion vectors as an auxiliary input in implementing motion blur. Such metadata and auxiliary input data may be obtained from the system that generates the rendered images to which the frame transformation pipeline is applied, e.g., a graphics processing system. Other metadata, which may be provided for example as part of a G-buffer, can be used in implementing shaders to enhance the appearance of surfaces, materials and textures, i.e., because additional metadata (such as material ID maps, albedo/reflectance or shading) can be used as required as inputs to more complex shaders that can modify lighting or surfaces in a scene. As a further example, rasterised semantic segmentation maps can be used to implement object-specific shaders, i.e., because these may be used to enable shaders to modify an aspect of only one type of object within a scene, for example skin, cars or foliage. Furthermore, supplementary neural networks may be included that also replicate visual characteristics of these type, or enhance the effect applied by the trained shaders. Additionally, the frame transformation pipeline 102 may comprise shaders and/or supplementary neural networks that replicate other visual characteristics that are not necessarily representative of an image capture process: e.g., artistic style.

Training

The shaders 202*a-n* that make up the frame transformation pipeline 102 are preferably trained as a generative adversarial network (GAN) as illustrated in FIG. 1. There is a variety of different architectures that may be used to formulate a generator suitable for training the present frame transformation pipeline. Furthermore, there is a variety of architectures of the discriminator and a variety of formulations of the objective loss function that may be used within the GAN, in addition to other hyperparameters that may be used to define the global structure and operation of the GAN.

Each shader (except for any supplementary neural network shader) is defined based on a mathematical formula or algorithm, which in some examples may be representative of a physical phenomenon. The learned shaders are configured to be trained to learn a certain visual characteristic from target image data, and subsequently impose that visual characteristic to the extent that it exists in the target data. In other words, the shaders are trained to impose a particular visual effect as opposed to merely amplify a visual characteristic. For example, the 'lens blur' shader may be trained to apply more or less blur to an input image depending on the blurriness of the target images relative to the input images. Using the lens blur example, the lens blur shader is implemented to impose some degree of blur, and the training process learns to what extent to impose the blur.

In the present disclosure, the preferred discriminator 104 architecture is based on the CycleGAN architecture, as disclosed in "*Unpaired Image-to-Image Translation using Cycle-Consistent Adversarial Networks*", Zhu et al., 2020. This discriminator operates globally over the input frame (where that input frame may be a sub-frame of the image), and has an architecture referred to as 'PatchGAN'. The discriminator network of this type splits an input image (e.g., the output image 114 of the generator 102) into a set of patches, where the patches preferably overlap with one another. The discriminator thus outputs an indication as to whether each of the patches is real or fake (i.e., belongs in the set of target images or has been generated by the generator). The advantage of using a discriminator that partitions input frames into overlapping sub-frames (i.e., the patches) is that this architecture uses fewer parameters than a global discriminator that operates over a full-image would need. Thus, patch-based discriminators operate on arbitrarily large images in a convolutional fashion and in a computationally efficient manner.

The presently described model assumes that there is statistical independence between pixels that are separated by more than a patch diameter. Alternatively, in some examples, the patch diameter may be actively selected based on a determination of the distance at which pixels become independent from one another. Thus, this type of discriminator models the image as a random Markov field. Advantageously, since random Markov fields are well-suited to model textures and style, the discriminator's predictions may be used in training as a form of texture/style loss.

Figure 7:
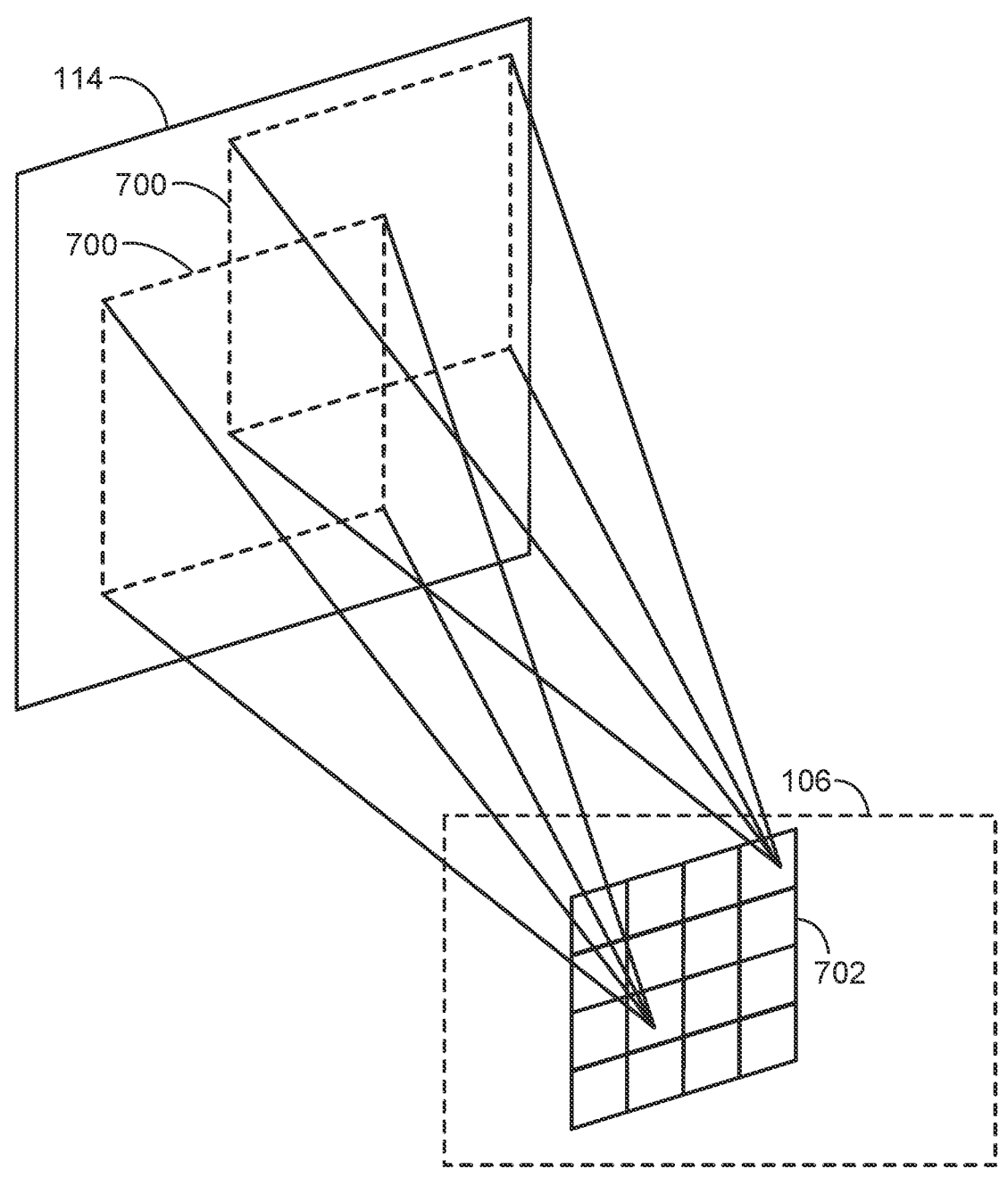
FIG. 7 illustrates part of the operation of a discriminator forming part of the generative adversarial network shown in FIG. 1.

FIG. 7 illustrates the operation of a discriminator according to preferred embodiments. The output image 114 is generated by the generator 102 shown in FIG. 1. Here, the generator 102 represents a frame transformation pipeline comprising one or more shaders whose parameters are updated by the GAN, and therefore may be in their initialised state, or a semi-trained state). Alternatively, the generator may comprise a complete frame transformation pipeline containing the 'complete' set of shaders, but where only a subset of the shaders may be trained at a time. A patch 700 is extracted from the image 114, where this individual patch 700 is part of the input for the discriminator. For each patch 700 extracted, the discriminator will output an indication of whether the patch is 'real' or 'fake'. As described above, the output will be a probabilistic value, e.g., selected from [0, 1], indicating the probability of a patch belonging to the target dataset. A set of patches 702 is extracted, where the set 702 may encompass the entire input frame 114. The patch 700 may be a square, e.g., an N×N patch, and preferably has dimensions of 70×70 pixels. Generally, any arbitrary patch dimension (i.e., non-square) may be used. Each patch 700 of the set of patches 702 therefore contributes to the discriminator output 106 indicated in FIG. 1.

In some cases, however, the set of patches may be deliberately selected not to encompass the entire input frame 114, i.e., the patches may be arranged to crop the edges of the of the frame 114 to improve discriminator behaviour. In other words, certain regions of the input frame may be excised 114. For example, some generators are susceptible to producing artefacts around the edges of images (e.g., certain types of blur), where those artefacts provide an indication to the discriminator that the generated output 114 is 'fake'. In some cases, the unwanted 'artefacts' excised from the images may represent some visual artefact or characteristic that is different to one or all of the respective particular visual characteristics that are intended to be replicated by the respective one or more shaders. Thus, to avoid tell-tale signs of the generator and thus improve the training rate and training stability of the generator and discriminator, these tell-tale signs may be removed. In other words, if it is too 'easy' for the discriminator to categorise a generated image as fake, the discriminator will not be well incentivised to improve, and training and will not be effective (e.g., the training of the GAN may converge to an inaccurate point or diverge). Input images 114 may thus be edited, i.e., regions of the image 114 may be excised, in some consistent manner (e.g., cropped) so that the discriminator is trained more effectively.

In addition to the patches described above, in each epoch, the input dataset (images 112) may be split into batches containing N input images. Correspondingly, N target images 110 are selected (at random) from the target image set 110. It will nevertheless be appreciated that the corresponding N images are statistically unpaired images (i.e., there is no link or mapping between the N input images and the N target images). Each batch is used for a single training iteration.

Because the training is based on unpaired images there is no 'ground truth data' from the perspective of the GAN. So, in the present case, the GAN is not trained on image pairs, which would contain an explicit mapping (a direct correspondence) of one image to its 'filtered' counterpart. The advantage of using unpaired training data is that any arbitrary set of images can be used to train a GAN. For example, if the aim is to train a transformation pipeline to replicate image-capture phenomena to produce photorealistic images, it would be impractical to obtain 'pairs' of rendered scenes and counterpart photographs. Moreover, unpaired images do not generally require preparation prior to training (though in some cases data augmentation techniques may be applied). Thus, training a photorealistic shader is particularly suited to using unpaired image data because an arbitrary set of target images (sharing one or more visual characteristic) can be selected independently from the production or provenance of the input images.

Nevertheless, in some examples, paired training may be applied in addition to the unpaired training, or as an alternate. For example, a set of paired training data could be generated comprising [X, Y] pairs of images, in which the X image is a rendered image and the Y image is a 'target' image that may be a photograph showing the exact scene of the rendering, or may have been generated by a large and/or undifferentiated neural network. Thus, in addition to (or in place of) the adversarial loss function described herein, it would be possible to use a ground truth loss (e.g., pixel-wise MSE/MAE loss and perceptual loss) for certain applications.

FIG. 8 shows a flowchart illustrating a method of transforming rendered frames in a graphics processing system using a frame transformation pipeline having been trained as described according to the present examples. The method obtains enhanced frames comprising one or more desired characteristics exhibited in a set of target images.

A feature of the shaders, specifically the function or algorithm defining the shader, is that they are differentiable during training. This is because, during backpropagation, the derivative with respect to the error (as determined by the adversarial loss function) is calculated and passed through to the parameter being trained, which is subsequently updated. Consequently, the shaders, prior to and during training, are designed to be differentiable to enable backpropagation for the training of the shader module and the pipeline as a whole. In this regard, the inclusion of any small/supplementary neural networks (as described above) in each shader should not violate the differentiability or modularity of those shaders.

Nevertheless, it will be appreciated that backpropagation is only carried out during the training of the pipeline. An advantage of using and training differentiable shaders, i.e., in a similar fashion to the backpropagation training of neural networks, is that it enables the use of standard tools and mechanisms for the training of neural networks, which can thus be incorporated/combined with to the (modules of the) frame transformation pipeline. Since the shaders need not be differentiable after having been trained, the boundaries of the functions defining the shaders may differ between training and deployment of the shaders. For example, shaders may be merged together into one shader, or multiple stages of a single shader may be split into multiple separate shaders or compute kernels.

Step S100 comprises selecting a plurality of shaders, where each shader is defined by a parametrized mathematical function arranged to replicate a particular visual characteristic. It should be appreciated that, in accordance with the training described above, for each shader of the plurality of shaders, parameters of the parametrized mathematical function (that define the shader) have been derived in dependence on a set of target images. Thus, the parameters are derived (corresponding to the shaders having been trained) in order that the shader is arranged to impose, when applied to an image 112 (or frame/patch 700 from that image), its respective particular visual characteristic in dependence on an extent to which the particular visual characteristic is exhibited in the set of target images. In other words, once trained, each shader will impose only the particular visual characteristic that the shader is configured to apply (i.e., based on its mathematical form). Furthermore, each shader will only impose that particular visual characteristic to the extent that the visual characteristic is exhibited in the target image, because the shaders have been trained to replicate a characteristic only to the extent that said characteristic actually exists in the target image. Consequently, the term 'impose' is intended to cover not only adding but subtracting a visual characteristic. For example, where a rendered image 112 has a stronger bloom effect than a set of target images, a shader may be trained to impose a reduction in bloom characteristic on input images. It will be understood that the 'extent' to which a characteristic is exhibited encompasses not just a magnitude or amount of that visual characteristic, but also a type or manner of that characteristic. For example, a blur may exhibit a different visual appearance that is independent of the amount or strength of blur.

Step S102 comprises combining the plurality of shaders to form a frame transformation pipeline. The shaders are configured to operate independently of one another. Therefore, in general, the frame transformation pipeline is configured to be agnostic of the order of the shaders; i.e., the output of the enhanced images may be substantially unaffected by a different ordering of the shaders in the pipeline. Nevertheless, it may be advantageous for certain shaders for the shaders to be combined in a particular order (e.g., as mentioned above, in cases where the shaders are configured to replicate an image-capture phenomenon).

Step S104 comprises obtaining one or more rendered frames 112. These rendered frames may have been generated by the graphics processing system of which the frame transformation pipeline is a part. Alternatively, the one or more rendered frames 112 may have been pre-generated, or may have been generated by an external or remote graphics processing system.

Step S106 comprises applying each shader of the frame transformation pipeline to at least a portion of each of the one or more rendered frames to obtain one or more enhanced frames. In some examples, the shaders may be applied consecutively, where the term 'consecutive' should be understood as 'in serial', i.e., one after another, in which the intermediate output frame for each successive is used as the input frame for the next shader in the pipeline. However, the boundaries of the shaders may be changed once trained for deployment, for example, all the shaders may be merged into a single shader/kernel. In this way, the shader(s) may be applied in a 'depth-first' manner, in which as many shader stages as possible (and possibly the entire pipeline comprising all shaders) are applied to a small region of the input frame (including even a single pixel of the input frame) at a time. Consequently, the enhanced frame may be obtained in stages (e.g., region by region or even pixel by pixel). The shaders may be applied to the entirety (i.e., all pixels) of the input image. Alternatively, the shaders may be applied to only a subset, or plurality of subsets, of the input image. For example, as described above, a supplementary neural network may be configured to determine portions of the input image on which to impose the characteristics of the shaders in order to best replicate the characteristics of the target image data. In this regard, it will be appreciated that different shaders within the pipeline may be applied to a different portion/subset of the input image, for example, as directed by one or more neural networks. For example, the frame transformation pipeline may determine that one portion of the input should have increased boom imposed, and that a different subset or subsets of the image should have lens blur imposed. Certain shaders may be particularly suited to be applied only to certain portions of an input image, e.g., chromatic aberration tends to be most prominent in the edges of a photograph images, therefore a chromatic aberration shader may not be applied to the centre portion of an image.

Step S108 comprises outputting for display each of the one or more enhanced frames, wherein the enhanced frames exhibit the visual characteristics of the set of target images. The output frames may optionally be sent back for further processing, e.g., at a GPU or other processor within a graphics processing system before final display output.

It should be appreciated that the 'shaders', having been trained as individual units, may be merged or de-merged into one or more deployed shaders who boundaries differ from the shaders that were originally trained. Preferably, the trained shaders are deployed using as few separate units as possible, including even a single shader/compute kernel. This has the advantage that the frame transformation pipeline containing one or more deployed shaders (where a deployed shader may comprise functionality of one or more shaders as originally trained) can be applied in a 'depth-first' mode, meaning that the entire functionality of the pipeline is applied in one go to a single region (e.g., single pixel) of the input image. Thus, the enhanced frame may be obtained one region (e.g., pixel) at a time. This improves bandwidth efficiency of a deployed frame transformation pipeline.

Generally, the method of FIG. 8 and correspondingly the frame transformation pipeline may be embodied in any suitable software of hardware, or on fixed-function or programmable hardware, detailed examples of which are provided later. In particular, given that the pipeline pertains to applying a post-process to a rendered output, it would be particularly advantageous to implement the presently disclosed methods and/or functional blocks on a GPU. For example, it would be particularly advantageous to implement the presently disclosed methods and/or functional blocks in OpenCL. Such a GPU implementation also takes advantage of the highly parallel nature of GPU compute hardware, which is well-matched to image processing tasks such as those defined by the shaders of the method of FIG. 8, which each typically apply the same function to many pixels independently. Where certain functions are likely to be heavily reused, implementation in fixed function hardware may be used, which has the advantage of reducing power, bandwidth, latency and GPU usage at the cost of increased engineering effort and chip area.

FIG. 9 shows a flowchart illustrating a training method for training a frame transformation pipeline. The frame transformation pipeline is part of a graphics processing system and configured, consistent with the embodiments described herein, to transform rendered frames to produce enhanced frames comprising one or more desired characteristics exhibited in a set of target images. The frame transformation pipeline contains one or more shaders when training. Consequently, single shaders may be trained in isolation from other shaders.

Step S200 comprises receiving the set of target images and a set of input images having been rendered by the graphics processing system. The target images should preferably share one or more visual characteristics, and should preferably be of good quality (i.e., free of undesired anomalies or defects). As mentioned above, an advantage of the presently disclosed pipelines is that the shaders contain relatively few parameters, meaning that training is fast compared to large, fully parameterised, neural networks. This in turn means that, in principle, an arbitrarily large target data set may be used. Another advantage is that fewer parameters means that there is less chance of overfitting, making it possible to obtain good results with a much smaller target dataset.

Step S202 comprises applying each shader of the frame transformation pipeline to at least a portion of at least some of the input images to obtain one or more trial output frames. Where there is more than one shader, the shaders may be applied consecutively, i.e., one after another, where the output for each shader is used as input of the next shader. As described above, coalescing shaders once deployed can have efficiency advantages, however, during training and prior to deployment, the shaders need not be optimised for efficiency or bandwidth. As described above, up to N supplementary neural networks may be implemented in a pipeline 102 having N shaders. A neural network may be used to augment a shader, e.g., by applying a particular characteristic to only parts of an image based on local context. A neural network shader can also be implemented to work in conjunction with the whole pipeline of shaders. Supplementary network shaders can be used to capture nebulous traits of the target dataset and augment the output of the entire designed shaders pipeline.

Step S204 comprises calculating, at a parametrized discriminator, an indication of a similarity between visual characteristics of the trial output frames and the set of target images. As described above in respect of FIG. 7, the discriminator may calculate this indication based on first determining an objective score for each frame, and/or an objective score for a set of overlapping patches within each frame. Consequently, the indication may be calculated in dependence on a plurality of individual objective scores. Particular examples are described in more detail below.

Step S206 comprises applying, in dependence on the indication, a parameter update step to parameters of the discriminator and to parameters of each of one or more of the parametrized mathematical functions defining a respective one of the one or more shaders. The parameter update step may be a backpropagation step, where one backpropagation step is applied for each of the discriminator and for whichever shaders within the pipeline are being trained. In some embodiments, the parameter update step may be applied simultaneously to the discriminator and generator. In other embodiments, the parameter update may first be applied to the discriminator, and subsequently applied to the generator. In the latter example, the parameter update step applied to the generator may be applied in dependence on the update step having just been applied to the discriminator. Both the approaches mentioned above rely on one action to compute the adversarial loss term needed to update the parameters with backpropagation: the generator first transforms frames from one or more images sampled from an input dataset. The transformed images and one or more images (e.g., batch) sampled from the target dataset are then fed into the discriminator, which outputs predictions as to whether each image belongs to the target dataset or is a fake. The predictions can then be used to compute the loss term needed for backpropagation. In the case of a simultaneous update, only one prediction output is used to calculate the loss terms for both discriminator and generator, hence the backpropagation update for both the generator and discriminator can be done at the same step. In the other case, the backpropagation is separated and performed sequentially. In the separated update scheme, the discriminator is updated first, individually, after which the process is then repeated to obtain new predictions from the updated discriminator, where those new predictions are used to update the weights of only the generator.

It will therefore be appreciated that the parameter update step is configured to derive parameters of each of the said one or more of the parametrized mathematical functions (i.e., the one or more parametrized mathematical functions being trained at that epoch) in order that the respective one of the shaders is arranged to impose, when applied to a frame or frames, its respective particular visual characteristic in dependence on an extent to which the particular visual characteristic is exhibited in the set of target images.

In further detail, in some examples of the method described above, the following steps may be carried out at each epoch:

i. A batch of N input images is fed into the generator, which produces N generated images 114, one for each of the N input images 112. In other words, the batch containing N input images to transform (by the generator), and N images from the target dataset. Both sets of N images are drawn randomly.

ii. A generator 102 network (in this case, the frame transformation pipeline containing one or more shaders to be trained) is fed the N input images 112 and produces an output 114 for each of the images.

iii. The output of the generator 114 for that batch is fed into the discriminator 104. For each image, the discriminator partitions the image 114 into a set of patches 702.

iv. The discriminator generates a likeness indication indicating whether each patch is 'real' or 'fake'. Generating the likeness indication may comprise assigning a probability (i.e., one probability for each output frame) that the output 114 of the generator, or the target images 110, belong to the target dataset (which is representative of calculating a measure of how closely the mathematical distribution of the generated images matches a mathematical distribution of the target images). For example, if sixteen 70×70 patches are generated (as shown in the set 702 in FIG. 7) for each image in the batch, the discriminator will output 128 indications/probabilities.

v. The likeness indications are used to generate an objective (adversarial) loss, i.e., a single value representative of all the indications. Thus, the discriminator's output for the whole batch is input into an adversarial loss function which calculates a cost associated with the accuracy of the discriminator.

vi. Based on the objective (adversarial) loss, two parameter updates steps are carried out concurrently/simultaneously; i.e., one update step 116 to update the discriminator parameters, and another update step 118 to update the parameters of the one or more of the shaders and/or neural networks present in the generator 102 (i.e., dependent on which of the shaders are being trained at that time). An update step comprises applying a backpropagation algorithm to calculate the gradient of the loss function for each parameter in the generator/discriminator, then an optimiser algorithm is used to update the parameters using the gradient calculated by backpropagation. Alternatively, as described above, backpropagation can be separated into two stages so that the generator's update step is performed after the discriminator's update. In this scenario, the backpropagation step for the generator is dependent on an updated (adversarial loss) output of the discriminator, where the discriminator's updated output is calculated using weights/parameters that have just been updated by backpropagation. As mentioned, it is possible that the generator, at any given time, may contain other shaders whose parameters are constrained/frozen while other shaders are trained. During backpropagation, the discriminator updates its parameters in an attempt to reduce its loss, whereas the generator updates its parameters in an attempt to increase the discriminator's loss (which is equivalent to generating images more similar to the target dataset, thus increasing the confusion of the discriminator).

The backpropagation steps are applied for each batch in the training dataset. After all the batches have been processed, another epoch begins at step i) above. The GAN trains the networks over a plurality of epochs by repeating steps i) to vi), where at each epoch the datasets of the both the input images and the target data 110 may be split into new randomly drawn batches. This is repeated until the generator achieves the desired performance, e.g., the parameters of the generator converge, or after a certain number of epochs have been carried out, or the discriminator is unable to distinguish the generated from the target image set. For example, the exit condition of the GAN may be determined as when the discriminator starts classifying the generator output consistently with 'real' indicators, or the losses for the discriminator and the generator converge to a stable value.

The adversarial loss provides the discriminator with information regarding how accurate it was in distinguishing between fake and real images. For the generator, the adversarial loss provides an indication of how accurately the generated images 114 resemble the target dataset. It is emphasised that the discriminator does not know what visual characteristics the generator is attempting to impose/replicate in the generated images, therefore, the discriminator makes a global assessment of the similarly between generated images 114 and the target images 110.

The formulation of the adversarial loss is preferably that used in the 'EnlightenGAN', in which one global discriminator is used. This produces a prediction for each 70×70 overlapping patches over the entire input image. It should be appreciated that, in other literature, the type of discriminator disclosed in EnlightenGAN is deemed 'local' because it is implemented (in practice) to operate on patches rather than the whole image. However, the discriminator outputs a prediction for each overlapping patch in exactly the same way as a 'global' discriminator, thus the discriminator operates globally over each input frame whether that frame consists of a whole image or a small sub-frame/patch of an image, The adversarial loss function 108 formulation used for the global discriminator/generator backpropagation updates is taken from the one in Enlighten GAN, i.e., as disclosed in "*EnlightenGAN: Deep Light Enhancement without Paired Supervision*", Jiang et al., 2021. The discriminator's prediction is defined as two relativistic predictions. This notionally relates to estimating the probability that the 'real' data (i.e., contained in the target images 110) is more realistic than the 'fake' data (i.e., the generated images), and therefore encourages the generator to synthesise images that are more realistic than the real data. Given a discriminator D, and a generator pipeline P, a render input image from the graphics rendering source data 120, $x_{render}$, a 'true' image from the target data 100, $x_{real}$, and mathematical distributions $p_{real}$ and $p_{fake}$ corresponding to the target and generated image distributions (respectively), the relativistic prediction for real samples $D_{Rreal}$, and generated examples $D_{Rfake}$, is defined as:

$$D_{Rreal}(\theta_D, \theta_P) = D_{\theta_D}(x_{real}) - E_{P_{\theta_P(x_{render})} \sim p_{real}}\left[D_{\theta_D}\left(P_{\theta_P}(x_{render})\right)\right]$$

$$D_{Rfake}(\theta_D, \theta_P) = D_{\theta_D}\left(P_{\theta_P}(x_{render})\right) - E_{x_{real} \sim p_{real}}\left[D_{\theta_D}(x_{real})\right]$$

In this formulation, $\theta_D$ and $\theta_P$ are weighting parameters for the discriminator and generator pipeline, respectively. Thus, these weights are updated when the backpropagation step is performed. $D_{Rreal(\theta_D, \theta_P)}$ is the relativistic adversarial loss for the target dataset images. Given parameters $\theta_D$ and $\theta_P$, this represents the probability that an arbitrary sample of target dataset 110 images is 'more realistic' than a random sample of generated images 114. Conversely, $D_{Rfake(\theta_D, \theta_P)}$ is the relativistic adversarial loss for the generated images and, given the parameters $\theta_D$ and $\theta_P$, represents the probability that an arbitrary sample of generated images is 'more realistic' than a random sample of generated images.

The two relativistic discriminator predictions $D_{Rreal(\theta_D, \theta_P)}$ and $D_{Rfake(\theta_D, \theta_P)}$, in turn are used to define two losses for the discriminator and generator respectively:

$$L_D(\theta_D, \theta_P) =$$
$$E_{x_{real} \sim p_{real}}\left[(D_{Rreal}(\theta_D, \theta_P) - 1)^2\right] + E_{P_{\theta_P(x_{render})} \sim p_{fake}}\left[(D_{Rfake}(\theta_D, \theta_P))^2\right]$$

$$L_G(\theta_D, \theta_P) =$$
$$E_{P_{\theta_P(x_{render})} \sim p_{fake}}\left[(D_{Rfake}(\theta_D, \theta_P) - 1)^2\right] + E_{x_{real} \sim p_{real}}\left[(D_{Rreal}(\theta_D, \theta_P))^2\right]$$

As mentioned above, the $\mathcal{L}_{D(\theta_D, \theta_P)}$ loss term indicates an accuracy of the discriminator's ability to determine that a fake image is fake, and the $\mathcal{L}_{G(\theta_D, \theta_P)}$ term indicates the accuracy with which the generator is replicates characteristics of the target images. The goal therefore for the discriminator is to update $\theta_D$ to reduce the value of $\mathcal{L}_{D(\theta_D, \theta_P)}$, and to increase the value of $\mathcal{L}_{G(\theta_D, \theta_P)}$. In contrast, the generator has the opposite objective of trying to update Op so as to reduce its own loss ($\mathcal{L}_{G(\theta_D, \theta_P)}$) and to increase $\mathcal{L}_{D(\theta_D, \theta_P)}$. It should be appreciated that, although the two losses have different formulations, they both are functions of the discriminator prediction.

Given these two loss terms, and for a pipeline P, where $x_{fake} = P(x_{real})$, the adversarial training objective function 108 may be defined as:

$$\min_{\theta_P} \max_{\theta_D} \mathcal{L}_D(\theta_D, \theta_P) + \mathcal{L}_P(\theta_D, \theta_P)$$

Though other alternative formulations may be used. For example, a Learned Perceptual Image Patch Similarity (LPIPS) adversarial loss function may be used in other implementations.

To further improve the training performance and orthogonality of a pipeline containing multiple shaders, it can be advantageous to pretrain the parameters of particular shaders in isolation. Untrained shaders may then be supplemented to a pre-trained transformation pipeline, either in parallel or as an additional serial step, where the untrained shaders are then trained in conjunction with the pre-trained shaders. The pretrained shaders may be constrained during this subsequent training, or they may be allowed to be refined as part of the training of the generator. For example, pretraining shaders with more complex mathematical form and/or behaviour in isolation can be beneficial to final result quality. Even though this is possible, the inventors have established that in a frame transformation pipeline containing a lens blur, colour mapping, bloom, and sensor noise shader, the best results (i.e., which produced the most photorealistic output after training) are generally achieved when all the shaders are trained together from scratch. In this way, during training, each shader is able to update their parameters via backpropagation according to the effects of other shaders.

The learning rates of the generator and discriminator can be tuned to achieve the best cooperation between the learning rates of the two networks, and thus improve overall stability. For example, it may be detrimental for the generator' learning progress if the discriminator learned too quickly and thus became able to perfectly distinguish between 'real' and 'fake' images. The generator would not be incentivised or directed to improve in this case, because any modification to the generator's parameters would result in the same (high) loss. Conversely, if the generator learned too quickly, it could inadvertently drive the discriminator into new regions of feature space too soon without adequately capturing other regions, thereby resulting in a generator that does not give high quality results. For example, one way of mitigating the latter problem is to set the learning rate of the generator to be lower than that of the discriminator.

In general, the generator has less 'learning capacity' than the discriminator. This difference in learning capacity can cause the training process to collapse due to the discriminator outperforming the generator. To mitigate this, in preferred embodiments, randomly sampled noise is added to the output of each hidden layer in the discriminator. This artificially makes the job of the discriminator slightly harder without substantially reducing its performance, which helps the generator's parameters converge to the desired point. This modification significantly improves the stability of the overall training algorithm.

Additionally, regularisation, normalisation and spectral normalisation methods have been found to further improve the learning rate, stability, and convergence of the GAN training method. Therefore, such methods have been found to improve final results quality. The regularisation defines a penalty on the squared norm of the gradients of the discriminator for 'real' data predictions (as disclosed in "*Which Training Methods for GANs do actually Converge?*", Mescheder et al., 2018), defined as:

$$R_1(\theta_D) = \frac{\gamma}{2} \mathbb{E}_{x_{real} \sim p_{real}} \left[ \left\| \nabla D_{\theta_D}(x_{real}) \right\|^2 \right]$$

Where $\gamma$ is a constant that is empirically found to perform best when set to $2 \times 10^{-4}$, though this should be understood to be merely an example, and $\gamma$ may itself be learned to provide an optimum learning rate for a given combination of shaders. This regularization term may be added to the full adversarial training objective function of the adversarial model. The preferred embodiments use only spectral normalisation.

Spectral normalisation ("*Spectral normalisation for Generative Adversarial Networks*", Miyato et al., 2018) is a technique where the spectral norm of the discriminator's weights is normalised to control the Lipschitz constant of the discriminator function, and so maintain Lipschitz continuity for the discriminator. Intuitively, the Lipschitz continuity pertains to a limit on the first derivative of a function, such that maintaining the Lipschitz continuity for a discriminator's learning rate represents controlling (i.e., limiting) the speed at which the discriminator may learn. This helps prevent erratic or unstable learning behaviour. This constraint is defined as:

$$W_{SN}(W) := \frac{W}{\sigma(W)}$$

where W is the matrix weight of a discriminator later, $\sigma$(W) is the spectral norm of W, and $W_{SN}$ are the spectral normalised weights. Thus, for a discriminator with 1 layers, the spectral norm is applied to each $W^l$. Generally, to further help the convergence and stability of training, the learning rate for both the pipeline (i.e., the generator) and the discriminator may be set to a small value such as $1 \times 10^{-4}$.

Figure 10:
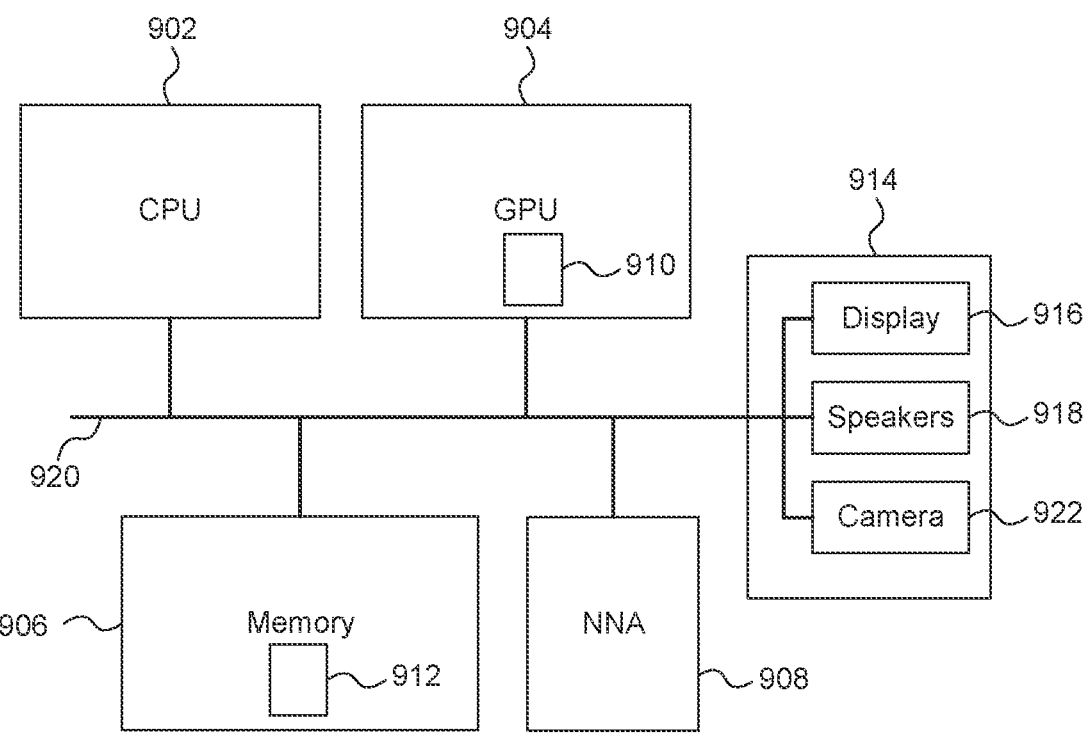
FIG. 10 shows a computer system in which a graphics processing system is implemented.

FIG. 10 shows a computer system in which the graphics processing systems described herein may be implemented. The computer system comprises a CPU 902, a GPU 904, a memory 906, optionally a neural network accelerator (NNA) 908, and other devices 914, such as a display 916, speakers 918 and a camera 922. A processing block 910 (corresponding to a processing implementing the frame transformation pipeline 102) is implemented on the GPU 904. In other examples, one or more of the depicted components may be omitted from the system, and/or the processing block 910 may be implemented on the CPU 902 or within the NNA 908. The components of the computer system can communicate with each other via a communications bus 920. A store 912 is implemented as part of the memory 906.

The training system of FIG. 1, the frame transformation pipeline of FIG. 2, and the computer system of FIG. 10 are shown as comprising a number of functional blocks. This is schematic only and is not intended to define a strict division between different logic elements of such entities. Each functional block may be provided in any suitable manner. It is to be understood that intermediate values described herein as being formed by a graphics processing system or frame transformation pipeline need not be physically generated by the graphics processing system or frame transformation pipeline at any point and may merely represent logical values which conveniently describe the processing performed by the graphics processing system or frame transformation pipeline between its input and output.

The graphics processing system or frame transformation pipeline described herein may be embodied in hardware on an integrated circuit. The graphics processing system or frame transformation pipeline described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring program-mable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system or frame transformation pipeline config-ured to perform any of the methods described herein, or to manufacture a graphics processing system or frame trans-formation pipeline comprising any apparatus described herein. An integrated circuit definition dataset may be, for example, an integrated circuit description.

Therefore, there may be provided a method of manufac-turing, at an integrated circuit manufacturing system, a graphics processing system or frame transformation pipeline as described herein. Furthermore, there may be provided an integrated circuit definition dataset that, when processed in an integrated circuit manufacturing system, causes the method of manufacturing a graphics processing system or frame transformation pipeline to be performed.

An integrated circuit definition dataset may be in the form of computer code, for example as a netlist, code for config-uring a programmable chip, as a hardware description lan-guage defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing com-mands, variables etc.) may be required in order for a computer system configured for generating a manufacturing definition of an integrated circuit to execute code defining an integrated circuit so as to generate the manufacturing defi-nition of that integrated circuit.

An example of processing an integrated circuit definition dataset at an integrated circuit manufacturing system so as to configure the system to manufacture a graphics processing system or frame transformation pipeline will now be described with respect to FIG. 11.

Figure 11:
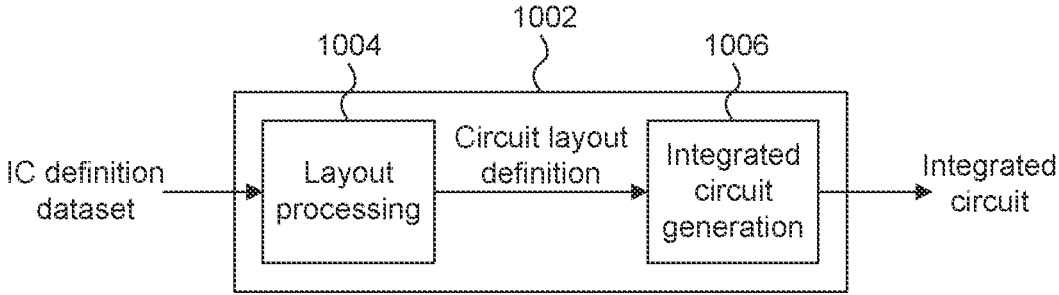
FIG. 11 shows an integrated circuit manufacturing system for generating an integrated circuit embodying a graphics processing system.

FIG. 11 shows an example of an integrated circuit (IC) manufacturing system 1002 which is configured to manu-facture a graphics processing system or frame transforma-tion pipeline as described in any of the examples herein. In particular, the IC manufacturing system 1002 comprises a layout processing system 1004 and an integrated circuit generation system 1006. The IC manufacturing system 1002 is configured to receive an IC definition dataset (e.g. defin-ing a graphics processing system or frame transformation pipeline as described in any of the examples herein), process the IC definition dataset, and generate an IC according to the IC definition dataset (e.g. which embodies a graphics pro-cessing system or frame transformation pipeline as described in any of the examples herein). The processing of the IC definition dataset configures the IC manufacturing system 1002 to manufacture an integrated circuit embodying a graphics processing system or frame transformation pipe-line as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be deter-mined from the gate level representation of the circuit by determining positional information for the logical compo-nents. This may be done automatically or with user involve-ment in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo litho-graphic and chemical processing steps during which elec-tronic circuits are gradually created on a wafer made of semiconducting material. The circuit layout definition may be in the form of a mask which can be used in a lithographic process for generating an IC according to the circuit defi-nition. Alternatively, the circuit layout definition provided to the IC generation system 1006 may be in the form of computer-readable code which the IC generation system 1006 can use to form a suitable mask for use in generating an IC.

The different processes performed by the IC manufactur-ing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system or frame transformation pipeline without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g., by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of transforming rendered frames in a graphics processing system to obtain enhanced frames comprising one or more desired characteristics exhibited in a set of target images, the method comprising:

selecting a plurality of trained shaders, each trained shader defined by a parametrized mathematical function arranged to replicate a particular visual characteristic, wherein, for each trained shader of the plurality of trained shaders: parameters of the parametrized mathematical function have been derived in dependence on a set of target images in order that the trained shader is arranged to impose, when applied to a frame, its respective particular visual characteristic in dependence on an extent to which the particular visual characteristic is exhibited in the set of target images, the parameters of the parametrized mathematical function thereby being trained and predetermined parameters;

combining the plurality of trained shaders to form a frame transformation pipeline;

obtaining one or more rendered frames;

applying each trained shader of the frame transformation pipeline to at least a portion of each of the one or more rendered frames to obtain one or more enhanced frames; and outputting for display each of the one or more enhanced frames, wherein the enhanced frames exhibit the visual characteristics of the set of target images.

2. The method of claim 1, wherein the parameters of the parametrized mathematical function have been derived using a neural network based on an adversarial objective function.

3. The method of claim 2, wherein the neural network is a generative adversarial network (GAN), comprising an image frame generator configured to produce candidate frames, and a discriminator configured to calculate a probability that the candidate frames produced by the image frame generator belong in the set of target images.

4. The method of claim 3, wherein the image frame generator comprises one or more precursor shaders, and wherein the GAN is configured to derive parameters for the one or more precursor shaders, in dependence on the set of target images, wherein the derived parameters represent parameters defining one or more parametrized mathematical functions that define a respective one or more trained shaders that form the frame transformation pipeline.

5. The method of claim 1, wherein each parametrized mathematical function represents an image-capture characteristic, and wherein the particular visual characteristic each trained shader is arranged to replicate is a physical phenomenon associated with an image-capture process.

6. The method of claim 5, wherein applying each trained shader comprises applying each trained shader in an order corresponding to an order in which the physical phenomena associated with an image-capture process would occur.

7. The method of claim 1, wherein each of the plurality of trained shaders are substantially mathematically orthogonal, such that each respective particular visual characteristic imposed by each trained shader in the one or more enhanced frames is substantially not affected by an imposed particular visual characteristic of any other trained shader of the plurality of trained shaders.

8. The method of claim 1, wherein the frame transformation pipeline comprises at least one neural network configured to further enhance frames based on a desired visual characteristic.

9. The method of claim 1, wherein the frame transformation pipeline comprises a parameter-adapting neural network, the method further comprising, prior to applying the trained shaders of the frame transformation pipeline to at least a portion of each of the one or more rendered frames:

modifying, by the parameter-adapting neural network, one or more parameters of the one or more trained shaders in dependence on the one or more rendered frames.

10. The method of claim 1, wherein combining the plurality of trained shaders to form a frame transformation pipeline comprises coalescing one or more of the trained shaders of the plurality of trained shaders into a combined trained shader unit that is arranged to replicate each respective particular visual characteristic of the one or more coalesced trained shaders.

11. The method of claim 1, wherein one of the plurality of trained shaders is a trained lens blur shader configured to replicate lens blur.

12. The method of claim 11, wherein the parametrized mathematical function comprises at least one kernel comprising an array of values, wherein applying the trained lens blur shader comprises convolving the at least one kernel over at least a portion of an array of values representing pixels of the one or more rendered frames.

13. The method of claim 1, wherein one of the plurality of trained shaders is a trained colour mapping shader configured to replicate colour mapping and/or distortion of the set of target images, wherein applying the colour mapping comprises applying a linear transformation and an offset to an array of values representing pixels of the one or more rendered frames.

14. The method of claim 1, wherein one of the plurality of trained shaders is a trained bloom shader configured to replicate the effect of light bleeding due to oversaturation in an image-capture system.

15. The method of claim 14, wherein applying the trained bloom shader to an input frame of the one or more rendered frames comprises:

downsampling the input frame to obtain a plurality of sub-frames each having a lower image resolution than a resolution of the input frame;
for each sub-frame:
extracting a luma channel,
isolating portions of the extracted luma channel above a brightness threshold, and
applying a blurring function to the isolated portions to obtain a bloomed sub-frame;
rescaling and combining each of the obtained bloomed sub-frames to obtain a bloom mask having the resolution of the input frame; and
combining the bloom mask with the input frame.

16. The method of claim 1, wherein one of the plurality of trained shaders is a trained sensor noise shader configured to replicate noise of a digital camera sensor or grain of a film camera, wherein applying the trained sensor noise shader comprises applying randomly distributed perturbations to values representing pixels of the one or more rendered frames.

17. The method of claim 1, wherein each trained shader of the plurality of trained shaders is a post-processing shader, and wherein the parametrized mathematical function defining each trained shader operates on pixel values of the portions of each of the one or more rendered frames during the step of applying each trained shader of the frame transformation pipeline.

18. The method of claim 1, wherein applying each trained shader of the frame transformation pipeline to the at least a portion of each of the one or more rendered frames comprises, for each portion to which the frame transformation pipeline is applied:

applying all trained shaders that form the frame transformation pipeline to a plurality of contiguous regions of the portion, wherein all trained shaders are applied to each region in turn, to obtain a plurality of enhanced sub-frames; and
combining the enhanced sub-frames to obtain an enhanced frame of the one or more enhanced frames.

19. A frame transformation pipeline module configured to transform rendered frames in a graphics processing system to obtain enhanced frames comprising one or more desired characteristics exhibited in a set of target images, the frame transformation pipeline module comprising logic configured to:

select a plurality of trained shaders, each trained shader defined by a parametrized mathematical function arranged to replicate a particular visual characteristic, wherein, for each trained shader of the plurality of trained shaders: parameters of the parametrized mathematical function have been derived in dependence on a set of target images in order that the trained shader is arranged to impose, when applied to a frame, its respective particular visual characteristic in dependence on an extent to which the particular visual characteristic is exhibited in the set of target images, the parameters of the parametrized mathematical function thereby being trained and predetermined parameters;
combine the plurality of trained shaders to form a frame transformation pipeline;
obtain one or more rendered frames;
apply each trained shader of the frame transformation pipeline to at least a portion of each of the one or more rendered frames to obtain one or more enhanced frames; and
output for display each of the one or more enhanced frames, wherein the enhanced frames exhibit the visual characteristics of the set of target images.

20. A non-transitory computer readable storage medium having stored thereon a computer readable dataset description of an integrated circuit definition dataset that, when processed in an integrated circuit manufacturing system, configures the integrated circuit manufacturing system to manufacture a frame transformation pipeline module configured to transform rendered frames in a graphics processing system to obtain enhanced frames comprising one or more desired characteristics exhibited in a set of target images, the frame transformation pipeline module comprising logic configured to:

select a plurality of trained shaders, each trained shader defined by a parametrized mathematical function arranged to replicate a particular visual characteristic, wherein, for each trained shader of the plurality of trained shaders: parameters of the parametrized mathematical function have been derived in dependence on a set of target images in order that the trained shader is arranged to impose, when applied to a frame, its respective particular visual characteristic in dependence on an extent to which the particular visual characteristic is exhibited in the set of target images, the parameters of the parametrized mathematical function thereby being trained and predetermined parameters;

combine the plurality of trained shaders to form a frame transformation pipeline;

obtain one or more rendered frames;

apply each trained shader of the frame transformation pipeline to at least a portion of each of the one or more rendered frames to obtain one or more enhanced frames; and output for display each of the one or more enhanced frames, wherein the enhanced frames exhibit the visual characteristics of the set of target images.

* * * * *